(12) United States Patent
Nesfield et al.

(10) Patent No.: US 12,470,871 B2
(45) Date of Patent: Nov. 11, 2025

(54) AUDIO-BASED AND VIDEO-BASED SOCIAL EXPERIENCES IN A NETWORKED MEDIA PLAYBACK SYSTEM

(71) Applicant: Sonos, Inc., Santa Barbara, CA (US)

(72) Inventors: James Nesfield, London (GB); Dayna Bateman, Seattle, WA (US); Klaus Hartung, Boston, MA (US); Nicholas D'Amato, Santa Barbara, CA (US); Seth Kaplan, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 415 days.

(21) Appl. No.: 17/342,322

(22) Filed: Jun. 8, 2021

(65) Prior Publication Data

US 2021/0385579 A1 Dec. 9, 2021

Related U.S. Application Data

(60) Provisional application No. 63/036,316, filed on Jun. 8, 2020.

(51) Int. Cl.
*H04R 5/04* (2006.01)
*H03G 1/02* (2006.01)
(Continued)

(52) U.S. Cl.
CPC .......... *H04R 5/04* (2013.01); *H03G 1/02* (2013.01); *H04N 21/4223* (2013.01);
(Continued)

(58) Field of Classification Search
None
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Walter F Briney, III

(57) ABSTRACT

An example video communication device is configured to (i) receive, from a computing platform via a wide area network (WAN), video and audio content corresponding to a video call, (ii) render the video content via at least one graphical display and render the audio content via at least one speaker, (iii) while rendering the video and audio content, determine that a user of the video communication device is located more closely to an audio playback device than to the video communication device, where the audio playback device is connected to the video communication device via a local area network (LAN), and (iv) based on determining that the user is located more closely to the audio playback device than to the video communication device, transmit the received audio content to the audio playback device via the LAN and cause the audio playback device to play back the audio content.

20 Claims, 17 Drawing Sheets

(51) Int. Cl.
  *H04N 21/4223*  (2011.01)
  *H04N 21/442*   (2011.01)
  *H04R 27/00*    (2006.01)
  *H04S 7/00*     (2006.01)

(52) U.S. Cl.
  CPC ....... *H04N 21/44218* (2013.01); *H04R 27/00* (2013.01); *H04S 7/302* (2013.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 9,226,101 B1* | 12/2015 | Ludwig ............ H04M 3/42348 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2010/0246845 A1* | 9/2010 | Burge ................. H04R 1/1041 |
| | | 381/59 |
| 2013/0029686 A1* | 1/2013 | Moshfeghi ............ G01S 5/0236 |
| | | 455/456.1 |
| 2014/0354441 A1* | 12/2014 | Luna .................. H04L 41/0803 |
| | | 340/686.6 |
| 2015/0245138 A1* | 8/2015 | Bender .............. H04N 21/4758 |
| | | 381/80 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

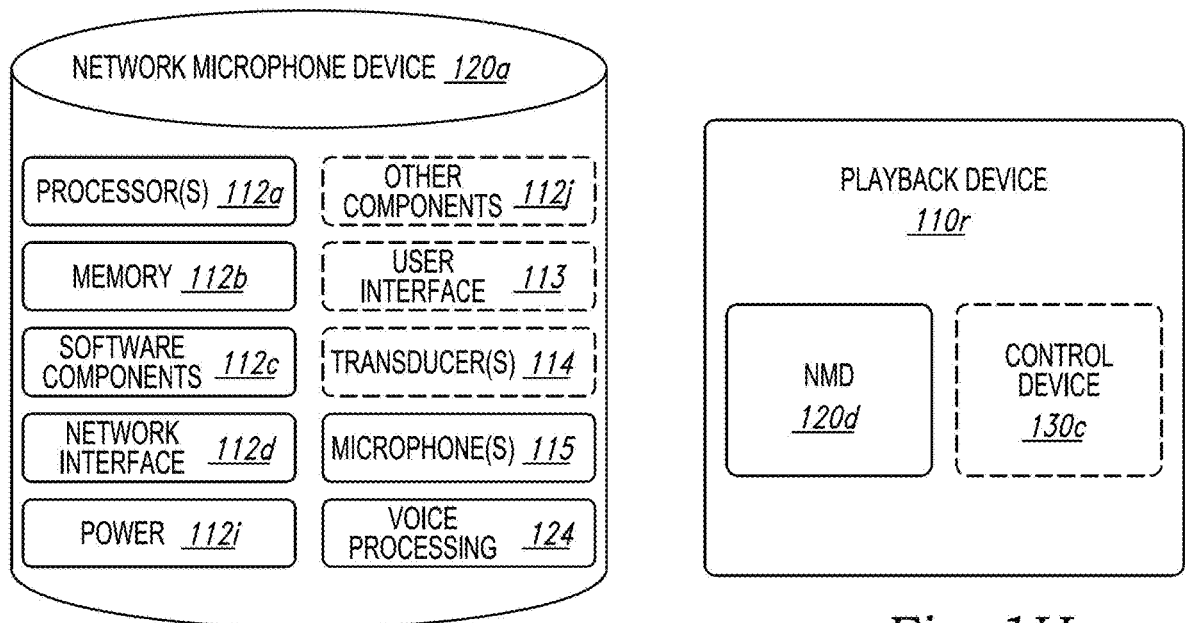
Fig. 1G
Fig. 1H
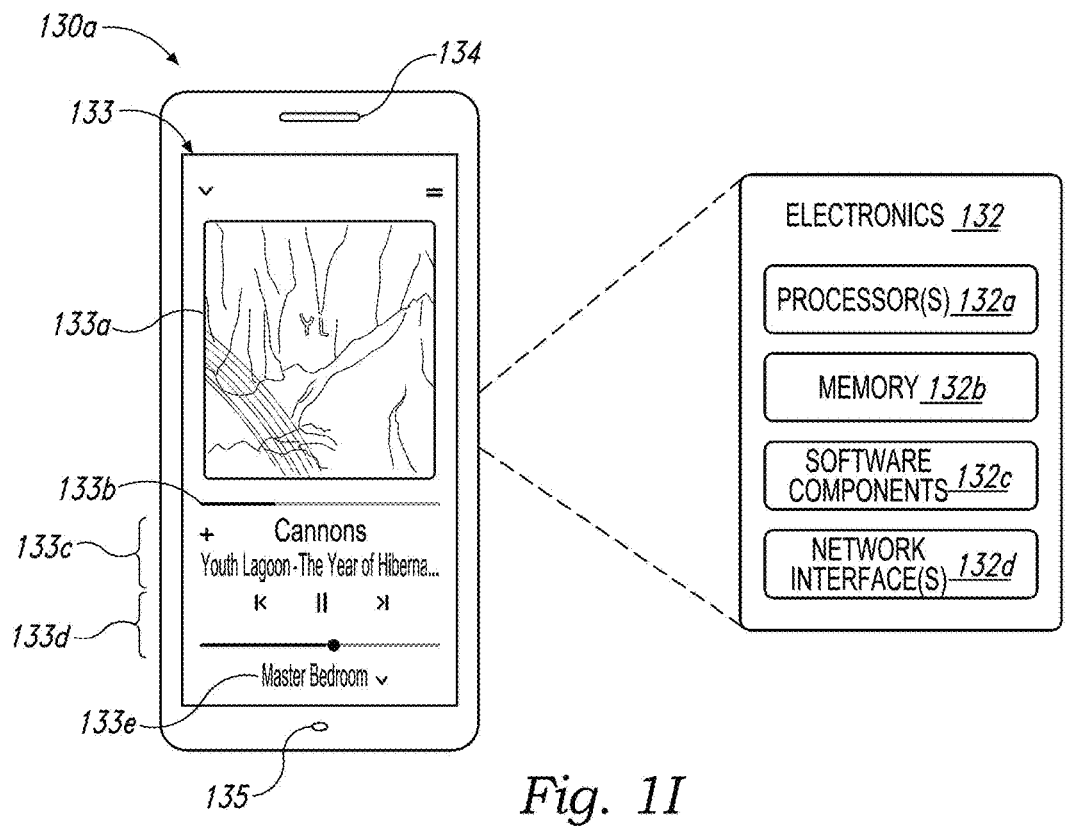
Fig. 1I

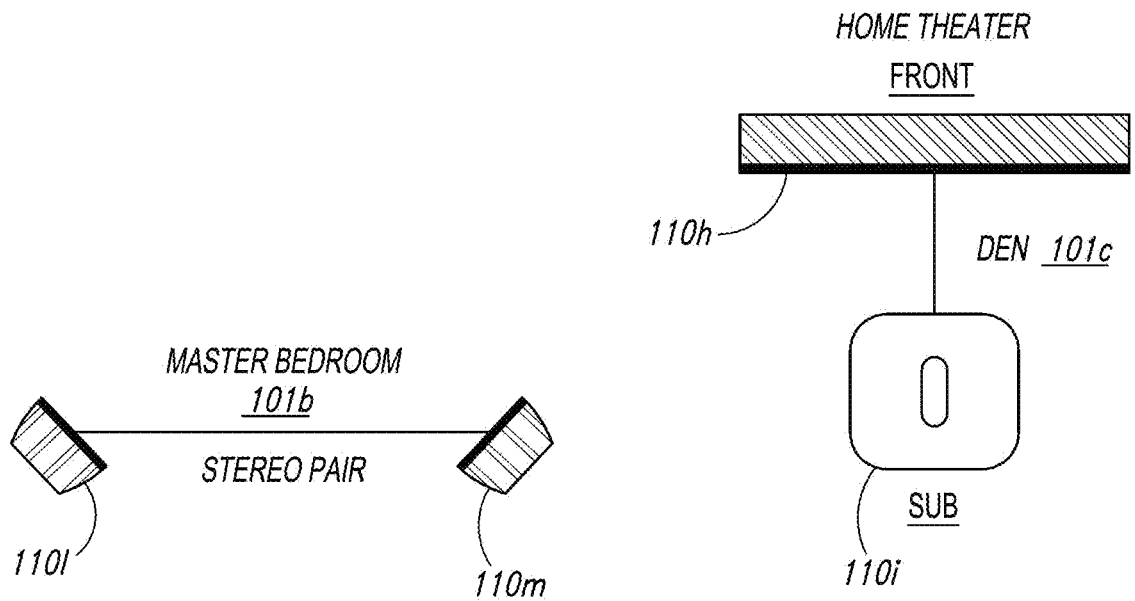
Fig. 1J
Fig. 1K
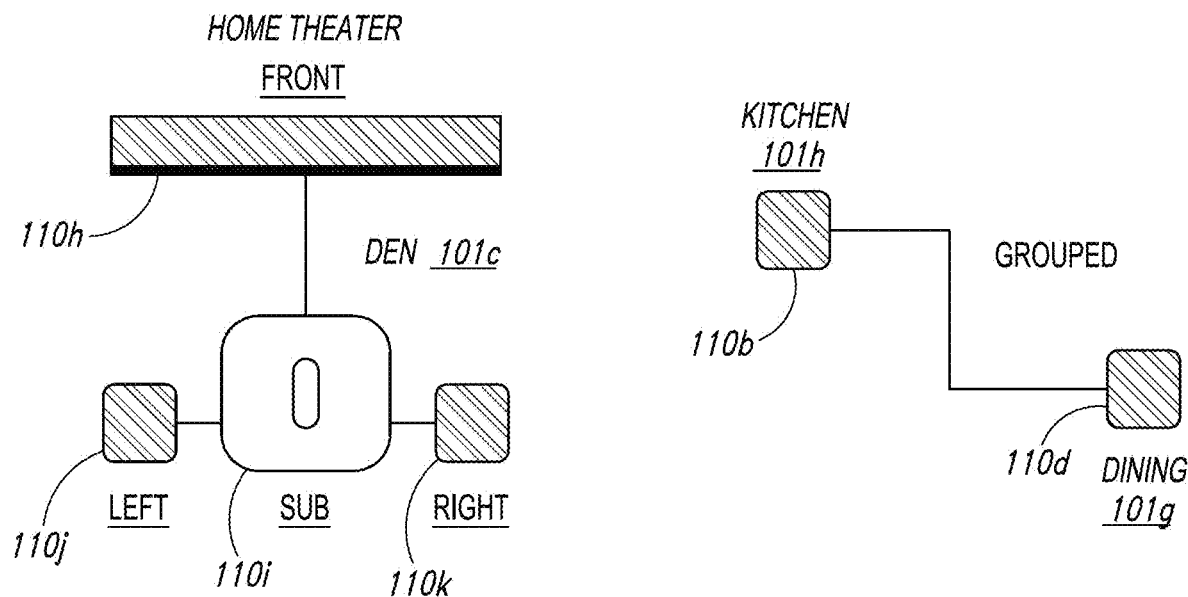
Fig. 1L
Fig. 1M

AUDIO-BASED AND VIDEO-BASED SOCIAL EXPERIENCES IN A NETWORKED MEDIA PLAYBACK SYSTEM

CROSS-REFERENCE TO RELATED APPLICATIONS

This application claims the benefit of priority under 35 U.S.C. § 119 to U.S. Provisional Patent App. No. 63/036,316, filed Jun. 8, 2020, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1G is a block diagram of a network microphone device.

FIG. 1H is a block diagram of a playback device.

FIG. 1I is a partially schematic diagram of a control device.

FIGS. 1J through 1M are schematic diagrams of corresponding media playback system zones.

Figure 1A:
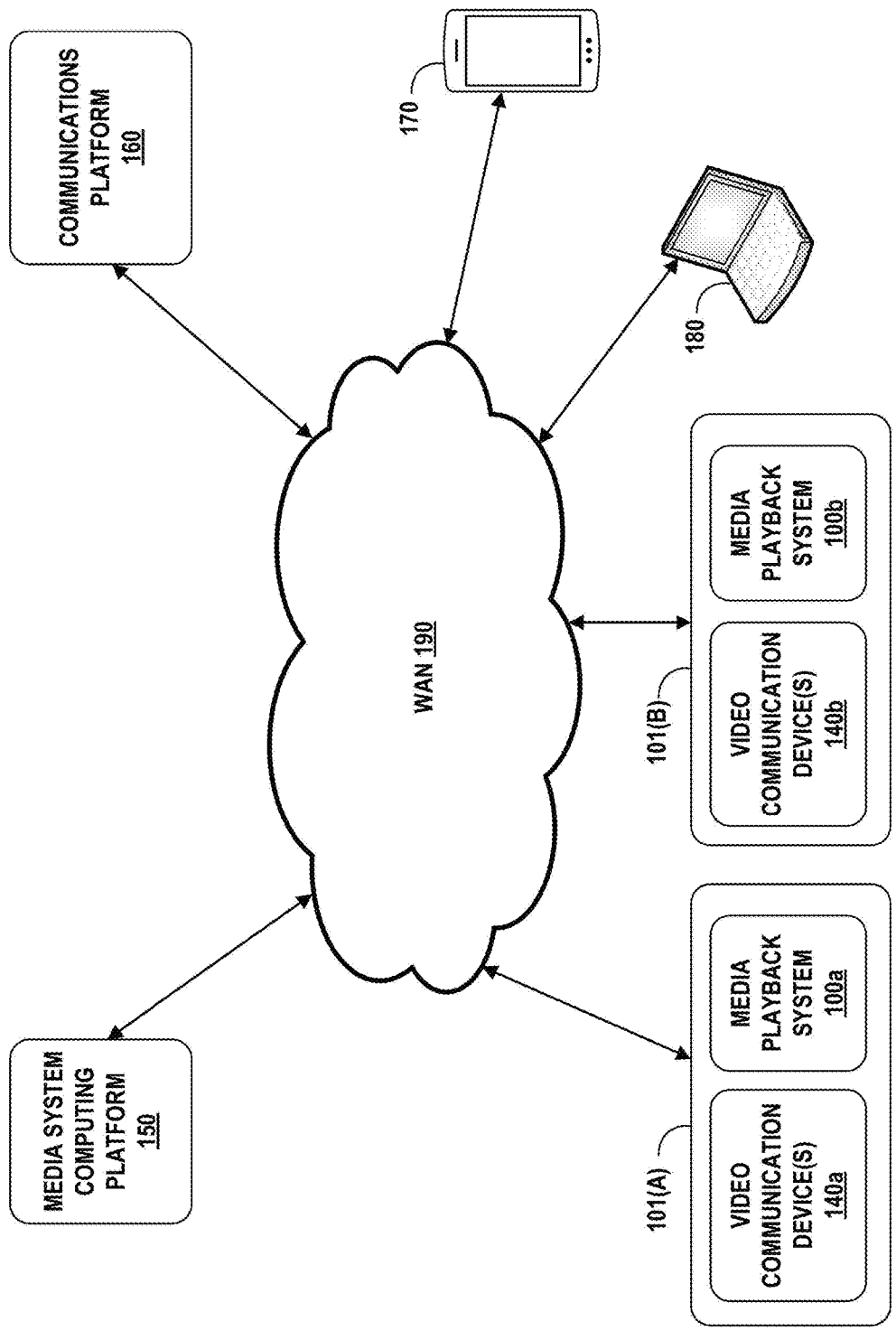
FIG. 1A is an example network configuration in which example implementations may be practiced.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to audio- and video-based social experiences that may be facilitated in an environment that includes a media playback system including one or more networked audio playback devices. In particular, examples are described below in which one or more playback devices of the media playback system cooperate with one or more video communication devices within the environment that are used to make and receive video and/or audio calls with users located in different environments.

There are various advantages that may be associated with utilizing the playback devices of a media playback system in this way. For example, playback devices designed for audio playback in a multi-room media playback system will generally have audio rendering capabilities that are superior to those of a dedicated video communication device, including more and larger speaker drivers as well as more advanced audio processing components. Further, the playback devices discussed herein may be more numerous in a typical environment (e.g., a house) than dedicated video communication devices, which may provide increased flexibility for where a user may be located within the environment. Still further, certain social experiences such as shared music listening or shared movie watching between different locations may require the management and synchronization of multiple audio and video streams, which may be more easily facilitated by the playback devices of a media playback system than a dedicated video communication device. Various other benefits and advantages will become apparent with reference to the examples and discussion herein.

In some embodiments, for example, a video communication device including at least one speaker, at least one graphical display, at least one processor, non-transitory computer-readable medium and program instructions stored on the non-transitory computer-readable medium that are executable by the at least one processor such that the video communication device is configured to (i) receive, from a computing platform via a wide area network (WAN), (a) video content corresponding to a video call and (b) audio content corresponding to the video call, (ii) render (a) the video content via the at least one graphical display and (b) the audio content via the at least one speaker, (iii) while rendering (a) the video content and (b) the audio content, determine that a user of the video communication device is located more closely to an audio playback device than to the video communication device, where the audio playback device is connected to the video communication device via a local area network (LAN), and (iv) based on determining that the user is located more closely to the audio playback device than to the video communication device, transmit the received audio content corresponding to the video call to the audio playback device via the LAN and cause the audio playback device to play back the audio content corresponding to the video call.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 100a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example Network Configuration

FIG. 1A shows an example network configuration in which one or more embodiments disclosed herein may be practiced or implemented. As shown, the network configuration includes a wide area network ("WAN") 190 that communicatively couples a media system computing platform 150, a communications platform 160, one or more computing devices 170 and 180, and devices within a first playback environments 101(A) and a second playback environment 101(B) (e.g., two different houses), each of which may include a respective media playback system 100a, 100b and a respective one or more video communication device(s) 140a, 140b.

For instance, the playback environment 101(A) may include the media playback system 100a having at least one playback device and at least one video communication device 140a that, in some examples, may not be a part of the media playback system 100a, but nonetheless may communicate with the at least one playback device of the media playback system 100a over a local area network ("LAN") of the playback environment 101(A). Alternatively, in some other examples, the video communication device 140a may be capable of performing one or more operations in conjunction with the at least one playback device such that it may be considered a part of the media playback system 100a. Further, it should be understood that the network configuration shown in FIG. 1A may include more or fewer of the depicted network elements and/or may include various other network elements not shown in FIG. 1A (e.g. one or more media services and/or media content sources).

The WAN 190 may include the Internet and/or one or more cellular networks, among other networks. Although the WAN 190 is shown as one network, it should be understood that the WAN 190 may include multiple, distinct WANs that are themselves communicatively linked. The WAN 190 may facilitate transferring data between one or more of the various network elements shown in FIG. 1A. In some examples, a given network element may communicate with another network element through yet another network element. For instance, the media playback systems 100a and 100b may communicate with the communications platform 160 through the media system computing platform 150 and/or the computing devices 170 and 180 may communicate with the media system computing platform 150 through the communications platform 160. Other examples are also possible.

In some examples, certain network elements may be communicatively coupled to other network elements via means other than the WAN 190. In particular, certain network elements may be communicatively coupled via a LAN (e.g., via WiFi), a personal area network (e.g., via Bluetooth), and/or other connections (e.g., via a wired connection). For example, the computing device 170, which may be a smartphone or the like, may communicate with the media playback system 100a via a LAN (e.g., WiFi or perhaps according to a proprietary protocol). The computing device 170 may do so while operating as part of the media playback system 100a (e.g., as a control device).

The media system computing platform 150 may generally comprise any one or more computer systems (e.g., one or more servers) that collectively include at least a processor, data storage, and a communication interface, all of which may be communicatively linked by a communication link that may take the form of a system bus, a communication network such as a public, private, or hybrid cloud, or some other connection mechanism. The communication interface may facilitate data flow over the WAN 190 between the media system computing platform 150 and other network elements. The at least one processor may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may also include program instructions that are executable by the processing unit to carry out various operations described herein.

Moreover, the media system computing platform 150 may be configured to store and/or access various data related to media items and/or media playback systems. In examples, the media system computing platform 150 may be configured to store and/or access media items that are playable by a media playback system. In such examples, the media system computing platform 150 may be configured to provide to a given media playback system media items (e.g., audio, video, and/or audio-visual files) such as a Uniform Resource Identifier (URI) and/or a Uniform Resource Locator (URL), among other links, pointers, or similar network location identifiers that are operable to locate the media items. Additionally, the media system computing platform 150 may be configured to store and/or access a cross-service linking database that facilitates identifying a media item from a first media source based on media item information from a second media source.

The media system computing platform 150 may also be configured to provide one or more media applications to the media playback systems 100*a* and 100*b* and/or the computing devices 170 and 180. In some cases, a media application may be operable to allow a computing device to control one or more media playback systems. Additionally, or alternatively, a media application may be operable to allow a media playback system to interface with the communications platform 160 and play back media items based on information received from the communications platform 160. Further still, a media application may be operable to provide functions similar to those provided by a communications application, discussed in further detail below. Other example media applications are also possible.

In some examples, the media system computing platform 150 may be configured to store and/or access account information corresponding to a particular media playback system. Such information, which may be collectively referred herein as a "playback system account", may include system information (e.g., a household identifier (HHID) that is used to uniquely identify the particular media playback system, identifiers of the devices within the particular system, the software version currently installed on the particular media playback system, etc.) user information (e.g., name, date of birth, etc. of the user or users of the particular system), playback history information (e.g., media items previously played on the particular system and perhaps timestamps indicating when such media items were played), playback preference information (e.g., frequency at which a given media item is played, indications of media items that have been "liked" or "starred", etc.), and linked-account information (e.g., one or more social-media accounts that are linked to the particular media playback system). Other examples of information storable and accessible by the media system computing platform 150 are also possible.

In some examples, a playback system account may also include information regarding the media services that provide media to the particular media playback system. For example, the playback system account may include one or more identifiers of media services that provide media to the particular media playback system. Such information may be used by the media system computing platform 150, or perhaps the communications platform 160, to recommend media services that a user might be interested in. Other examples are also possible.

In practice, the media system computing platform 150 may store some or all of the above-discussed information based on data received from media playback systems (e.g., the media playback systems 100*a* and 100*b*), the communications platform 160, and/or the computing devices 170 and 180. In examples, such information may be provided to the media system computing platform 150 when a media playback system is first setup, when a media playback system plays back media items, when a media playback system receives data indicating user feedback, and/or when a computing device runs a media application to control a media playback system, among other scenarios. In any event, the media system computing platform 150 may be configured to provide an option to a user to "opt in" so that the aforementioned information is collected by the media system computing platform 150.

The media system computing platform 150 may be further configured to use the above-discussed information to determine playback behaviors of users of media playback systems, among other operations. Based on user playback behaviors, the media system computing platform 150 may perform a number of operations that may add to the users' playback experience. For example, such information may be used to identify a trending artist and then recommend that trending artist to a user whose playback history indicates he/she listens to other artists similar to the trending artist. Other examples are certainly possible.

The communications platform 160 may generally comprise any one or more computer systems (e.g., one or more servers) that collectively include at least a processor, data storage, and a communication interface, all of which may be communicatively linked by a communication link that may take the form of a system bus, a communication network such as a public, private, or hybrid cloud, or some other connection mechanism, similar to those of the media system computing platform 150 discussed above.

The communications platform 160 may be provided by a video-conferencing and/or collaboration service provider that may make video communication devices 140*a* and 140*b* available for users to install in their home or office, and which may be facilitated by the communications platform 160. Further, the video-conferencing and/or collaboration service provider might make such video communication services available as web-based product, which may be run via a dedicated application or a web-browser on existing devices that a user might already possess (e.g., a computer, a smartphone, etc.). In this regard, the video communication devices 140*a* and 140*b* shown in FIG. 1A might include such devices.

In some implementations, the communications platform 160 may include a social-media platform that is configured to provide a social-media service to subscribers to the service. For example, the social-media computing platform may be configured to establish and/or maintain a social network. To this end, the social-media computing platform may be configured to host a social-media webpage accessible over the WAN 190 by subscribers utilizing any suitable computing device, such as the computing devices 170 and 180.

In examples, the social-media computing platform may be configured to store subscriber account information, which may be collectively referred to herein as a "social-media account". Such information may include the name, gender, birthdate, email address, and/or residential address, among other information, for each subscriber. Moreover, the social-media computing platform may also be configured to link a given subscriber with a particular media playback system. For example, when a user first subscribes to the social-media service, the user may provide information, such as a HHID, of a media playback system used by the user, and the social-media computing platform may then store such information in the account of the subscriber.

In addition to subscriber account information, the social-media computing platform may also be configured to store respective subscriber profiles for each subscriber. Broadly speaking, a subscriber profile may include information regarding a subscriber's life that the subscriber has chosen to share such as relationship status, photos, videos, career information, education information, hobbies/interests, locations visited (e.g., "check-in" locations), sports teams that the subscriber is a fan of, and/or movies, books, artists, TV shows, and the like that the subscriber previously experienced and perhaps enjoyed. Such information may be presented on a subscriber profile in a number of manners, such as through subscriber posts, status updates, blogs, and other uploads.

The social network provided by the social-media computing platform may be configured so that subscribers may readily share and exchange information, ideas, creations, and the like over a virtual community. The social-media service may provide to its subscribers, via a social-media webpage, respective social-media information that is determined to be relevant to a particular subscriber. Such information may be provided in several manners (e.g., as a "news feed", "timeline", or the like) and may be personalized to fit the preferences of a particular subscriber. In examples, this information may be continuously updated to reflect the most current information that may be relevant to a particular subscriber.

A given subscriber may have certain "friends" that he/she chooses to associate with on an example social network. After someone is deemed a "friend" with a given subscriber, the given subscriber may then receive social information that is uploaded, tagged, posted, or otherwise provided by the "friend." For example, the given subscriber's news feed may show a photograph that a "friend" captured and subsequently posted to the social-media webpage. Moreover, a listing of a given subscriber's "friends" may also be provided and that listing may include various information in various forms reflecting a current "status" or the like for a given "friend." The given subscriber may also be able to "de-friend" someone that was previously deemed a "friend."

In practice, the social-media computing platform may be configured to collect and analyze the information that is shared and exchanged over the social-media service. The social-media computing platform may be configured to use this collected information, as well as subscriber account information, to determine, for a particular subscriber, other subscribers that the particular subscriber might want to become "friends" with. In this way, the social-media computing platform may be configured to determine the preferences and/or tastes of its subscribers and recommend other subscribers with similar tastes.

Moreover, the social-media computing platform may be configured to provide one or more social-media applications that are operable to provide subscribers access to the social-media service in a manner different than through a web browser. Such an application may be installed on a computing device that is perhaps portable. In examples, a social-media application may further be operable to provide functions similar to those provided by a media application or a communications application, as discussed above.

In some implementations, the communications platform 160 may facilitate video and/or audio communications and other experiences between users who are located in different environments. For instance, the playback environment 101 (A) may include at least one video communication device 140a that includes a network interface, a processing unit, data storage, one or more microphones (e.g., one or more microphone arrays), one or more cameras, one or more speakers, and a graphical display. In some instances, the graphical display and the input interface may be part of the same component (e.g., a touchscreen). Alternatively, the video communication device 140a might not include a graphical display, but rather an interface for connecting to another device (e.g., a television) that includes a graphical display. Other configurations for the video communication device 140a are also possible.

The playback environment 101(B) may similarly include at least one video communication device 140b. Accordingly, a first user in playback environment 101(A) may "call" a second user located in playback environment 101(B). For example, the first user may select the second user from a list of friends in a social-media account using the input interface of the video communication device 140a. A message indicating the first user's request to communicate with the second user may be transmitted to the communications platform 160, which may then send a message to the video communication device 140b that causes a notification of the incoming call to be presented to the second user via the video communication device 140b or another computing device (e.g., the second user's smartphone installed with a relevant social-media application). Once the second user accepts the call, the video communication devices may allow the two users to hear and see each other and thereby engage in two-way communications that are transmitted via the communications platform 160. In some implementations, a communications application (e.g., a social-media application), and/or perhaps a media application, installed on a computing device may be operable to determine what, if any, other applications are also installed on the computing device. An application that is operable in such a manner may facilitate linking a playback system account with a communications system account, such as a social-media account, and vice versa. As one possibility, after a social-media application installed on a computing device is linked to a playback system account, the social-media application may be operable to affect playback of media at a media playback system identified by the playback system account.

The network configuration shown in FIG. 1A may also include one or more media service provider servers communicatively coupled to the WAN 190. In general, a given media service provider server may correspond to a media service provider that provides streaming media, such as Internet radio and/or "on-demand" media, to the media playback systems 100 and 100b and/or the computing devices 170 and 180. A user may subscribe to such a service and register media devices (e.g., a media playback system and/or one or more computing devices) that may at times be used to access the media service. A media service provider server may include similar components as the servers discussed above.

Generally speaking, the media playback systems 100a and 100b may be any type of media playback system configured to receive and transmit data over a communication network and playback media items. In practice, each media playback system 100a and 100b may include one or more playback devices, as well as additional system devices (e.g., a controller device). An example media playback system is discussed in further detail below with reference to FIGS. 1B-1C. It should be understood that the media playback system 100a and the media playback system 100b may be configured similarly or differently and/or may include similar or different devices.

In general, each computing device 170 and 180 may be any computing device configured to transfer data over a communication network. The computing devices 170 and 180 may each include at least one processor, memory, a graphical display, an input interface, and a network interface, among other components. In some instances, the graphical display and the input interface may be part of the same component (e.g., a touchscreen). The network interface may facilitate data flow between the computing device and another network element, for example, via the WAN 190. In some examples, one or more of the computing devices 170 and 180 may also include a camera configured to capture image and/or video data. Example computing devices include, but are not limited to, cellular phones, smartphones, PDAs, tablets, laptops, desktop computers, video game consoles, and smart TVs.

Moreover, the computing devices 170 and 180 may be configured to download, install, and operate an application, such as a media or social-media application. For example, a given computing device may include a media application provided by the media system computing platform 150 and a communications application (e.g., a social-media application) provided by the communications platform 160, while another computing device may include one or the other application but not both. Additionally, or alternatively, the 170 and 180 might communicate with the media system computing platform 150 and/or the communications platform 160 through a web browser-based application. Other examples are also possible.

A computing device may be configured to run both applications at the same time or individually. In some examples, the computing devices 170 and 180 may provide to the media system computing platform 150 and/or the communications platform 160 an indication of applications that are installed on a particular computing device. For instance, the computing device 170 may be configured to provide to the media system computing platform 150 an indication that a social-media application is installed. Additionally, or alternatively, the computing platform 150 may be configured to provide to the communications platform 160 an indication that a media application is installed and/or active or otherwise currently running.

Furthermore, a computing device may be configured to provide communications information and/or media playback information to the media system computing platform 150 and/or the communications platform 160. Such information may then be used by the media system computing platform 150 and/or the communications platform 160 to help perform some of the operations disclosed in further detail below.

III. Example Operating Environment

Figure 1B:
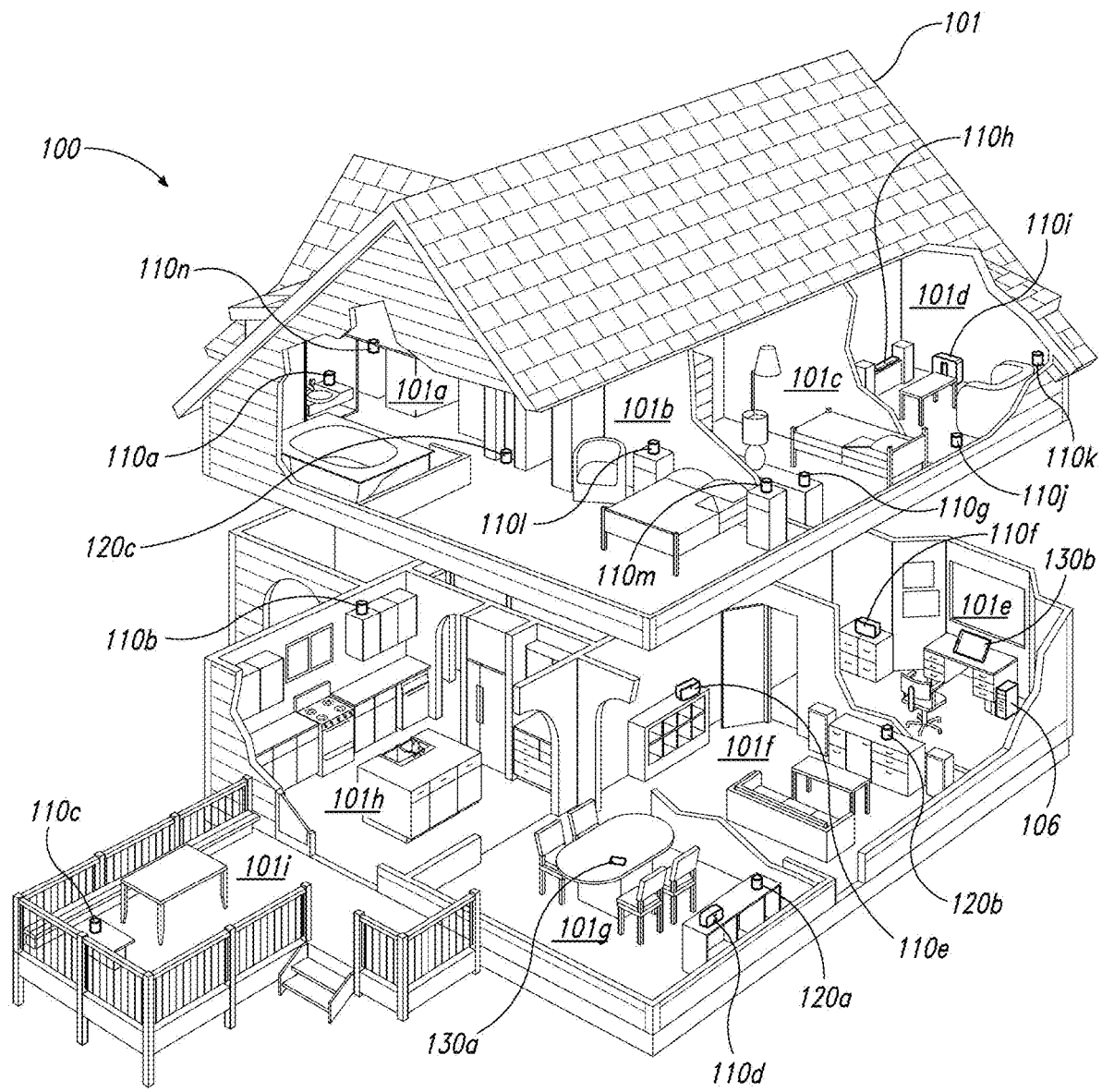
FIG. 1B is a partial cutaway view of an environment having a media playback system configured in accordance with aspects of the disclosed technology.

FIG. 1B is a partial cutaway view of a media playback system 100 distributed in an environment 101 (e.g., a house). In this regard, the media playback system 100 may represent one possible example of the media playback systems 100a or 100b shown in FIG. 1A. Similarly, the environment 101 may represent one possible example of the first playback environment 101(A) or the second playback environment 101(B) in FIG. 1A. As shown in FIG. 1B, the media playback system 100 includes one or more playback devices 110 (identified individually as playback devices 110a-n), one or more network microphone devices ("NMDs") 120 (identified individually as NMDs 120a-c), and one or more control devices 130 (identified individually as control devices 130a and 130b).

As used herein, the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein, the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1C-6.

In the illustrated embodiment of FIG. 1B, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1B. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1B, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1C, 1F, and 1J-1N.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip-hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1C:
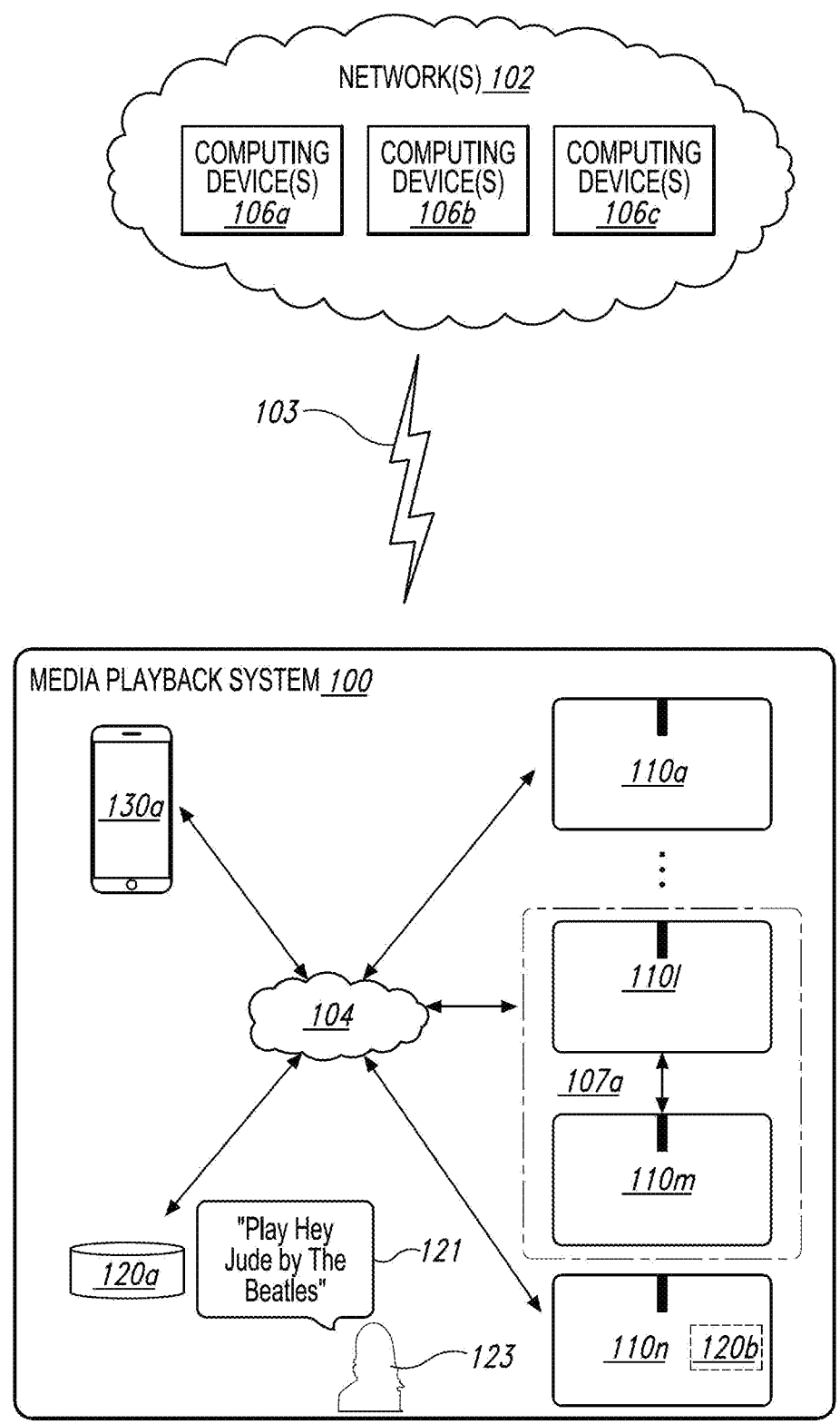
FIG. 1C is a schematic diagram of the media playback system of FIG. 1A and one or more networks.

FIG. 1C is a schematic diagram of the media playback system 100 and a cloud network 102. For ease of illustration, certain devices of the media playback system 100 and the cloud network 102 are omitted from FIG. 1C. One or more communication links 103 (referred to hereinafter as "the links 103") communicatively couple the media playback system 100 and the cloud network 102.

The links 103 can comprise, for example, one or more wired networks, one or more wireless networks, one or WANs such as the WAN 190 shown in FIG. 1A, one or more LANs, one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1C as having three of the computing devices 106, in some embodiments, the cloud network 102 comprises fewer (or more than) three computing devices 106. The cloud network 102 may include, for example, the media service computing platform 150 shown in FIG. 1A, as well as other devices and systems.

The media playback system 100 is configured to receive media content from the networks 102 via the links 103. The received media content can comprise, for example, a URI and/or a URL. For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1C, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1J through 1N.

The media playback system 100 includes the NMDs 120*a* and 120*d*, each comprising one or more microphones configured to receive voice utterances from a user. In the illustrated embodiment of FIG. 1C, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1D:
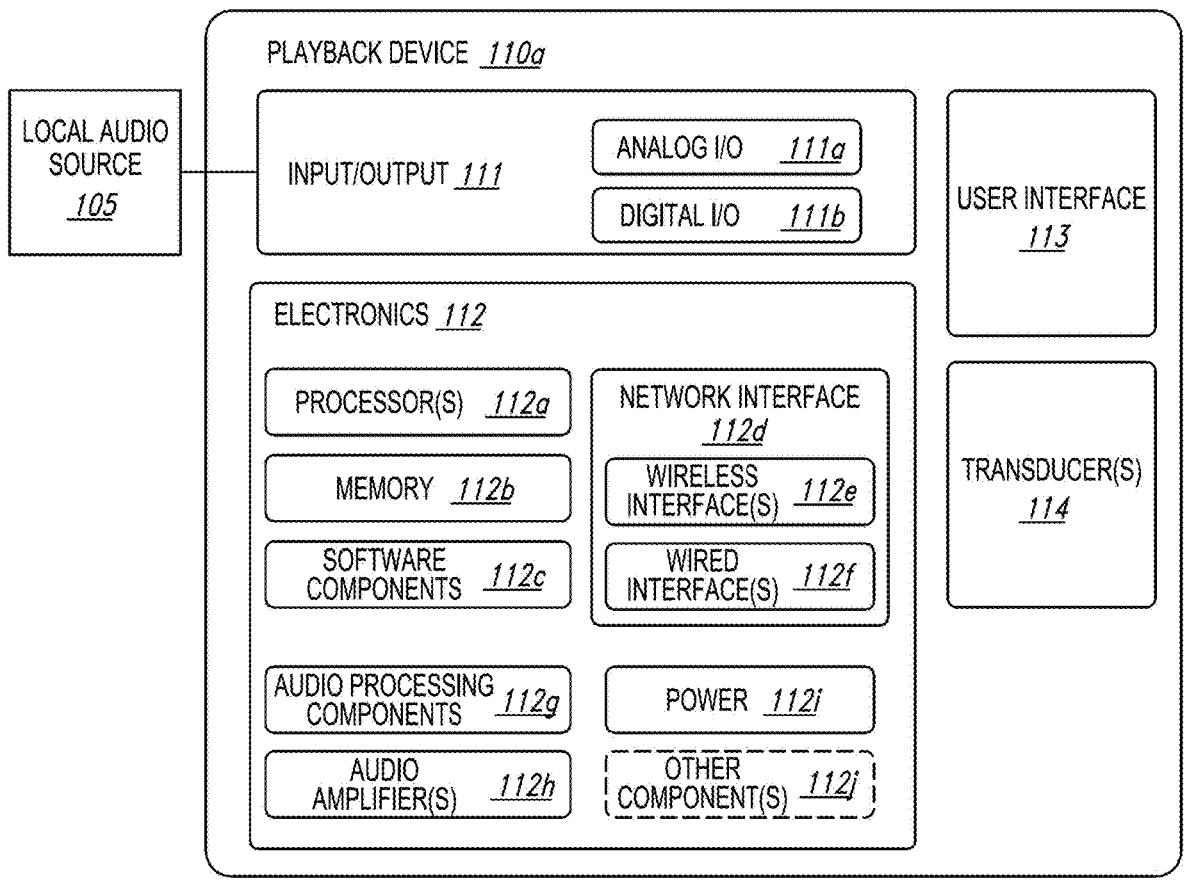
FIG. 1D is a block diagram of a playback device.

FIG. 1D is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1D)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1D, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1D)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1D). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1D, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1C) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1E:
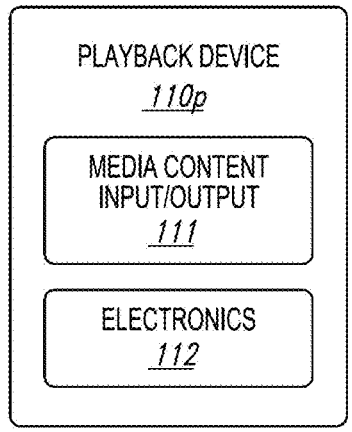
FIG. 1E is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1E is a block diagram of a playback device 110p comprising the input/output 111 and electronics 112 without the user interface 113 or transducers 114.

Figure 1F:
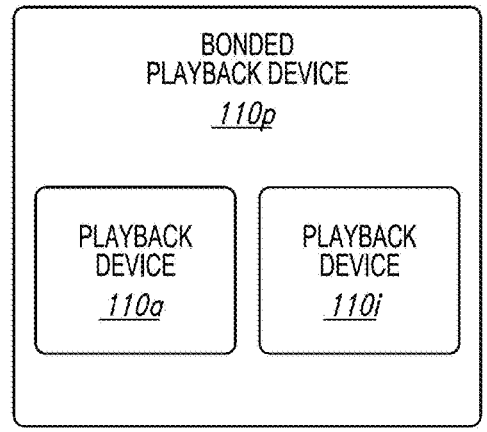
FIG. 1F is a block diagram of a bonded playback device.

FIG. 1F is a block diagram of a bonded playback device 110q comprising the playback device 110a (FIG. 1D) sonically bonded with the playback device 110i (e.g., a subwoofer) (FIG. 1B). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1D) and/or paired or bonded playback devices (e.g., the playback devices 110l and 110m of FIG. 1C). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1G is a block diagram of the NMD 120a (FIGS. 1B and 1C). The NMD 120a includes one or more voice processing components 124 (hereinafter "the voice components 124") and several components described with respect to the playback device 110a (FIG. 1D) including the processors 112a, the memory 112b, and the microphones 115. The NMD 120a optionally comprises other components also included in the playback device 110a (FIG. 1D), such as the user interface 113 and/or the transducers 114. In some embodiments, the NMD 120a is configured as a media playback device (e.g., one or more of the playback devices 110), and further includes, for example, one or more of the audio components 112g (FIG. 1D), the amplifiers 112h, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1D. In some aspects, for example, the NMD 120a includes the processor 112a and the memory 112b (FIG. 1D), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1H is a block diagram of a playback device 110r comprising an NMD 120d. The playback device 110r can comprise many or all of the components of the playback device 110a and further include the microphones 115 and voice processing 124 (FIG. 1G). The playback device 110r optionally includes an integrated control device 130c. The control device 130c can comprise, for example, a user interface (e.g., the user interface 113 of FIG. 1D) configured to receive user input (e.g., touch input, voice input) without a separate control device. In other embodiments, however, the playback device 110r receives commands from another control device (e.g., the control device 130a of FIG. 1D). Additional NMD embodiments are described in further detail below with respect to FIGS. 3A-3F.

Referring again to FIG. 1G, the microphones 115 are configured to acquire, capture, and/or receive sound from an environment (e.g., the environment 101 of FIG. 1B) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a SONOS® playback device). For example, a user might speak the activation word "Alexa" followed by the utterance "set the thermostat to 68 degrees" to set a temperature in a home (e.g., the environment 101 of FIG. 1B). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1I is a partially schematic diagram of the control device 130a (FIGS. 1B and 1C). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1H, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1C, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 1N.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1N:
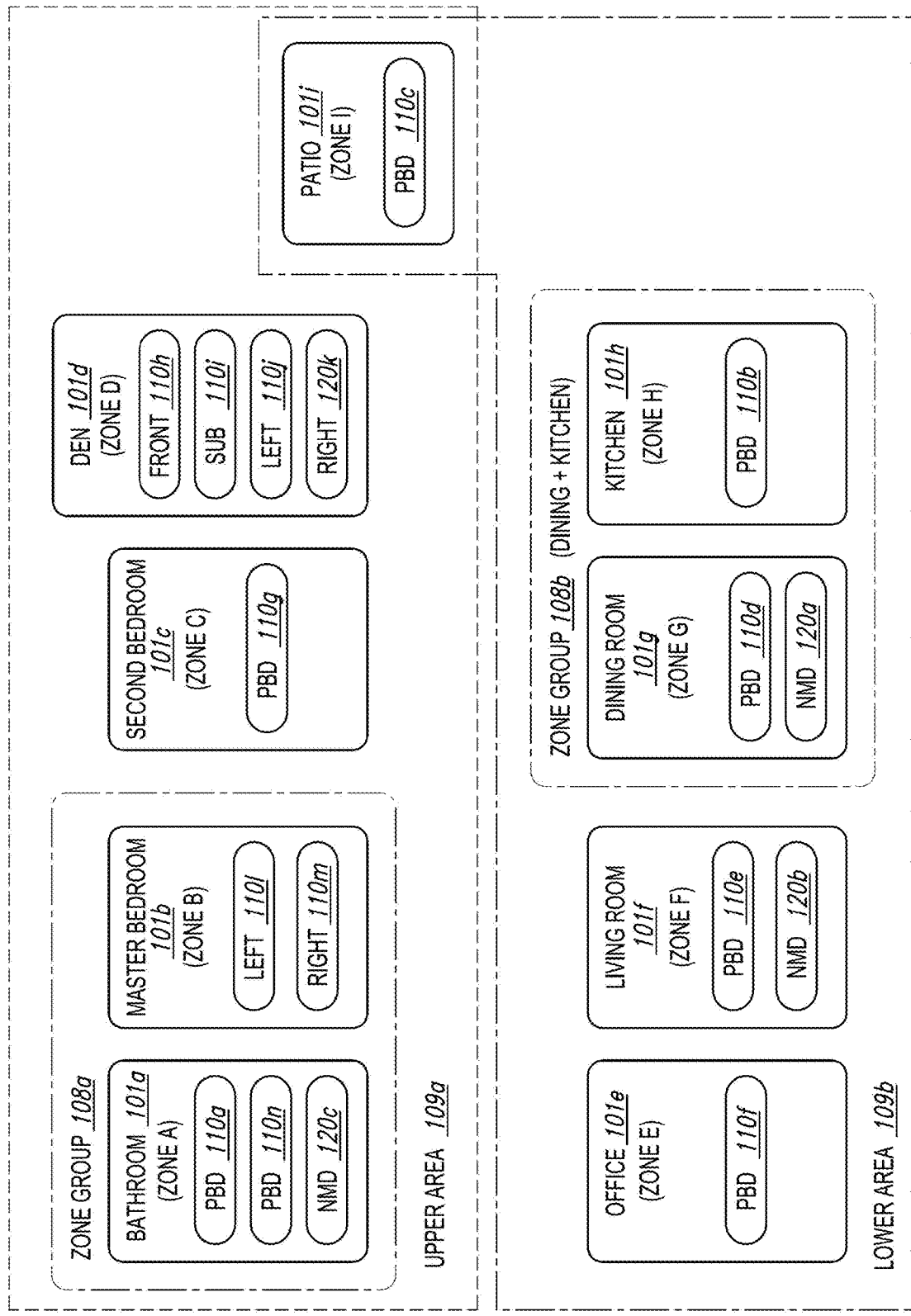
FIG. 1N is a schematic diagram of media playback system areas.

FIGS. 1J through 1N show example configurations of playback devices in zones and zone groups. Referring first to FIG. 1N, in one example, a single playback device may belong to a zone. For example, the playback device 110g in the second bedroom 101c (FIG. 1B) may belong to Zone C. In some implementations described below, multiple playback devices may be "bonded" to form a "bonded pair" which together form a single zone. For example, the playback device 110a (e.g., a left playback device) can be bonded to the playback device 110n (e.g., a right playback device) to form a part of Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback zones 110g and 110h can be merged to form a merged group or a zone group 108b. The merged playback zones 110g and 110h may not be specifically assigned different playback responsibilities. That is, the merged playback zones 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1L shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1N).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1N, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1N. In some embodiments, a zone group may be given a unique name selected by a user.

Certain data may be stored in a memory of a playback device (e.g., the memory 112b of FIG. 1D) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1N). Identifiers associated with the Kitchen may indicate the same or similar information by virtue of the Kitchen being part of the Dining+Kitchen zone group 108b. Other example zone variables and identifiers are described below.

In yet another example, the media playback system 100 may include variables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

IV. Example Systems and Devices

Figure 2A:
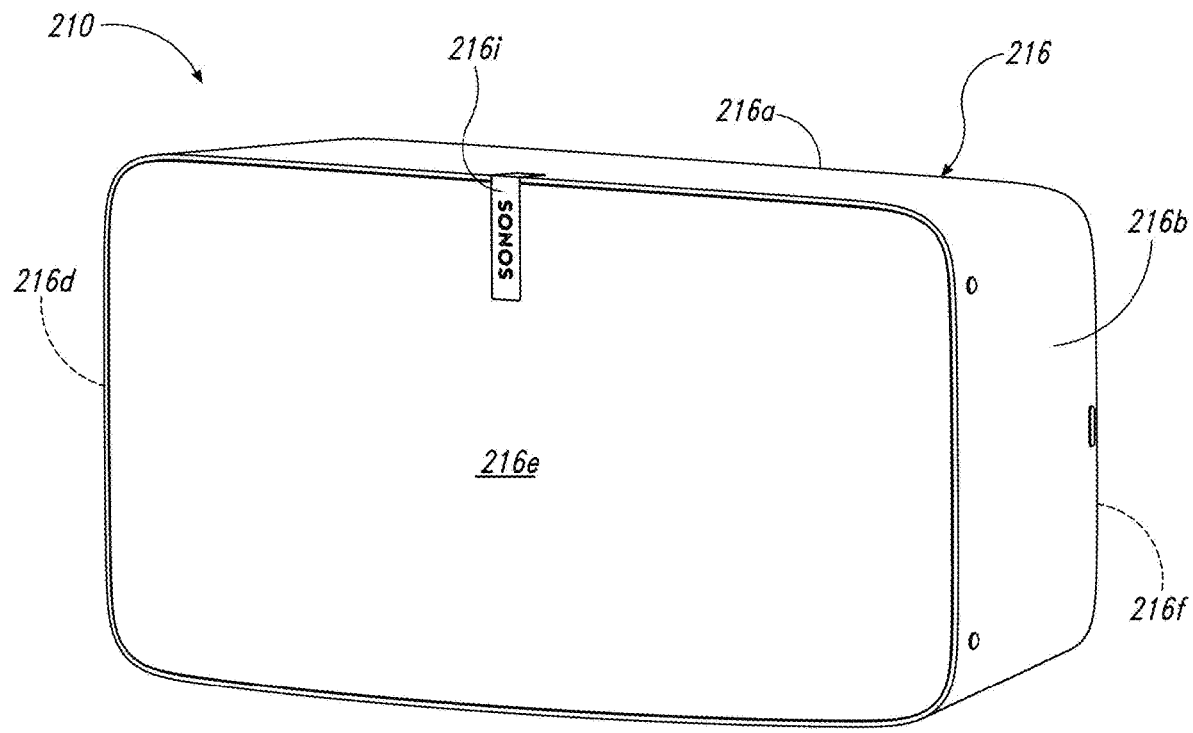
FIG. 2A is a front isometric view of a playback device configured in accordance with aspects of the disclosed technology.
Figure 2B:
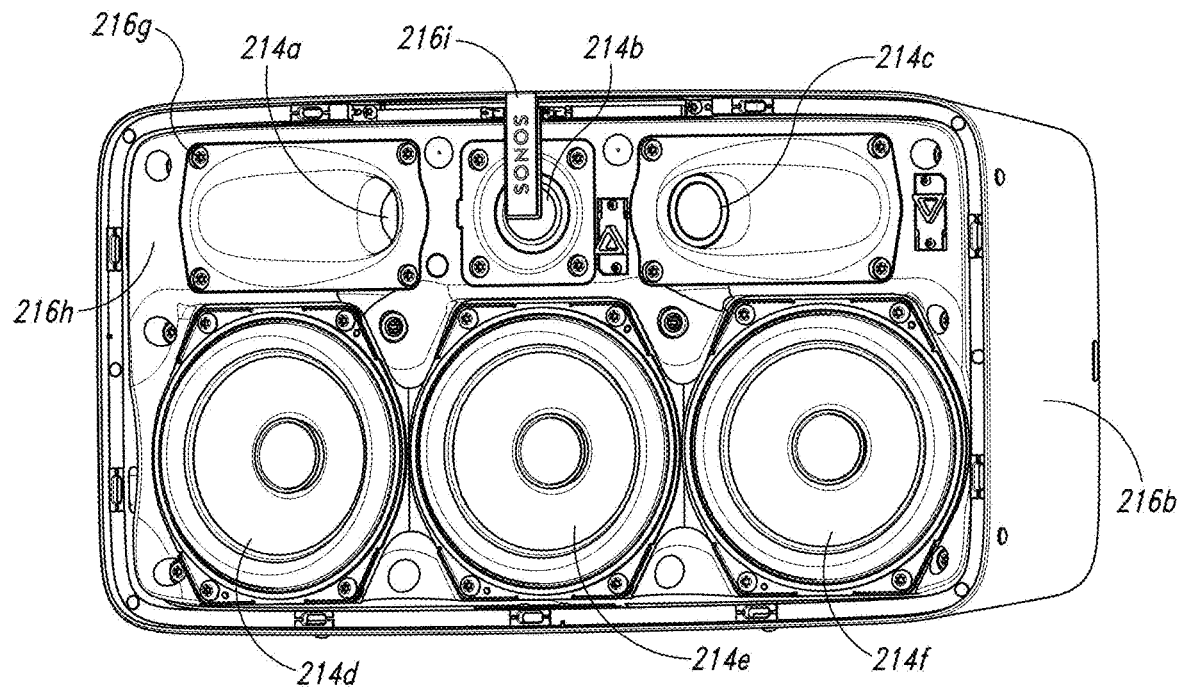
FIG. 2B is a front isometric view of the playback device of FIG. 2A without a grille.
Figure 2C:
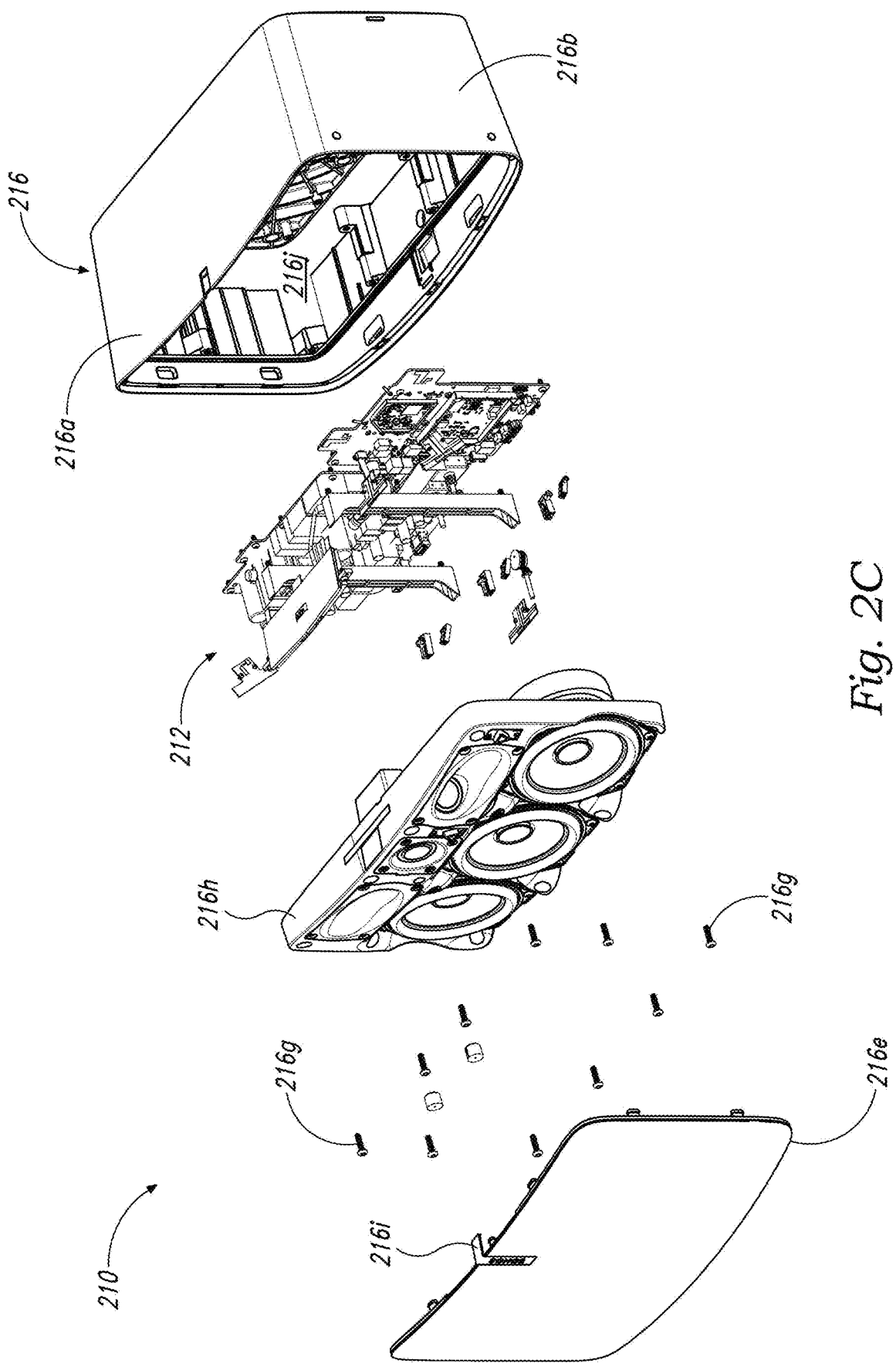
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1D) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
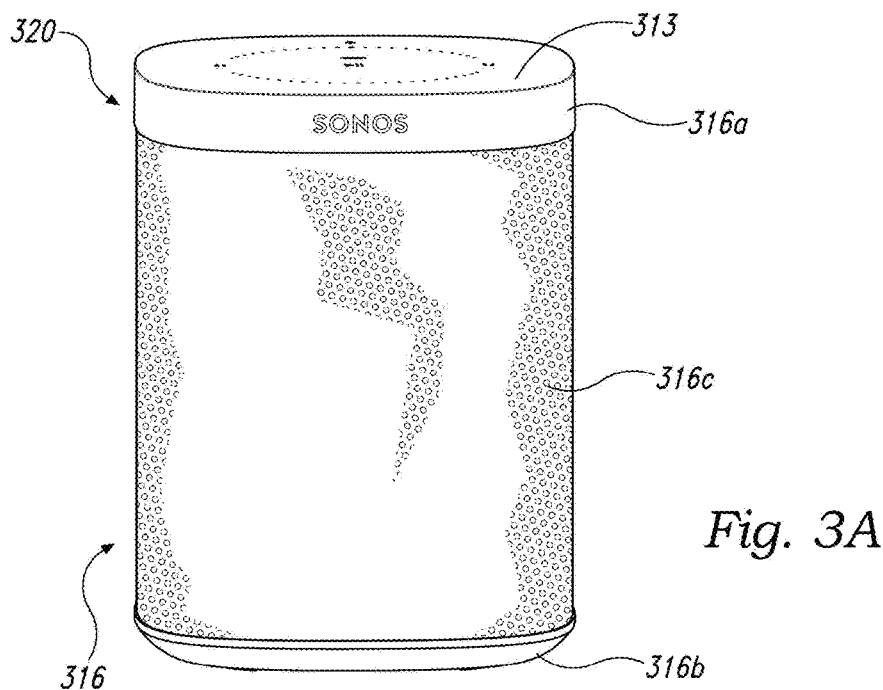
FIG. 3A is a front view of a network microphone device configured in accordance with aspects of the disclosed technology.
Figure 3B:
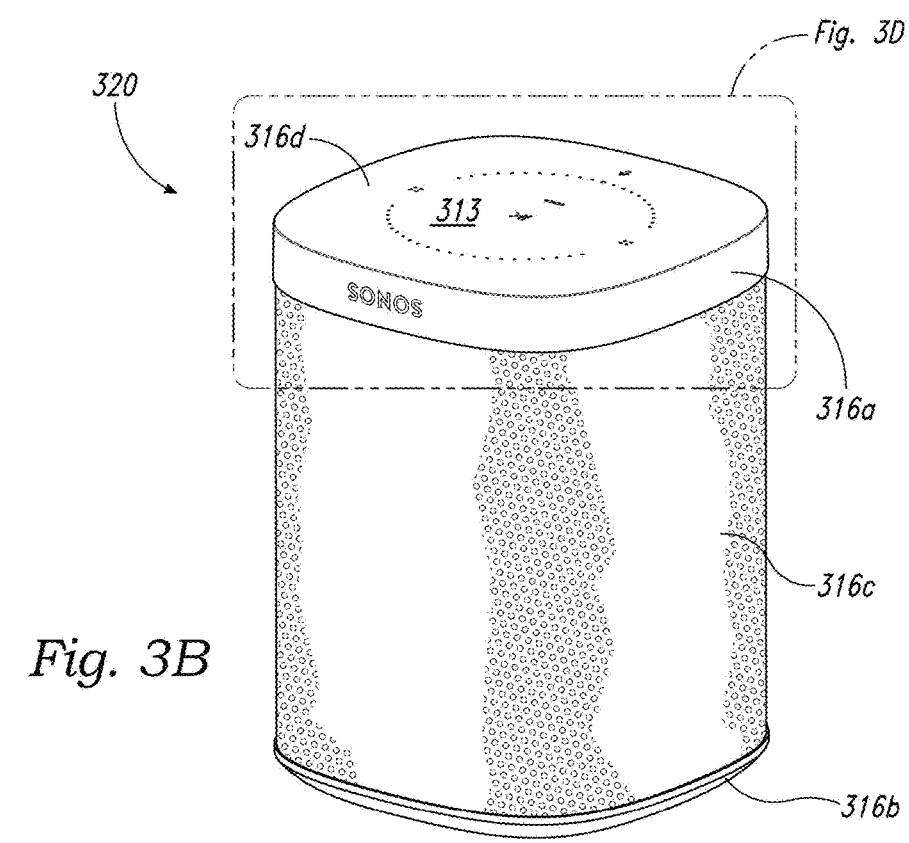
FIG. 3B is a side isometric view of the network microphone device of FIG. 3A.
Figure 3C:
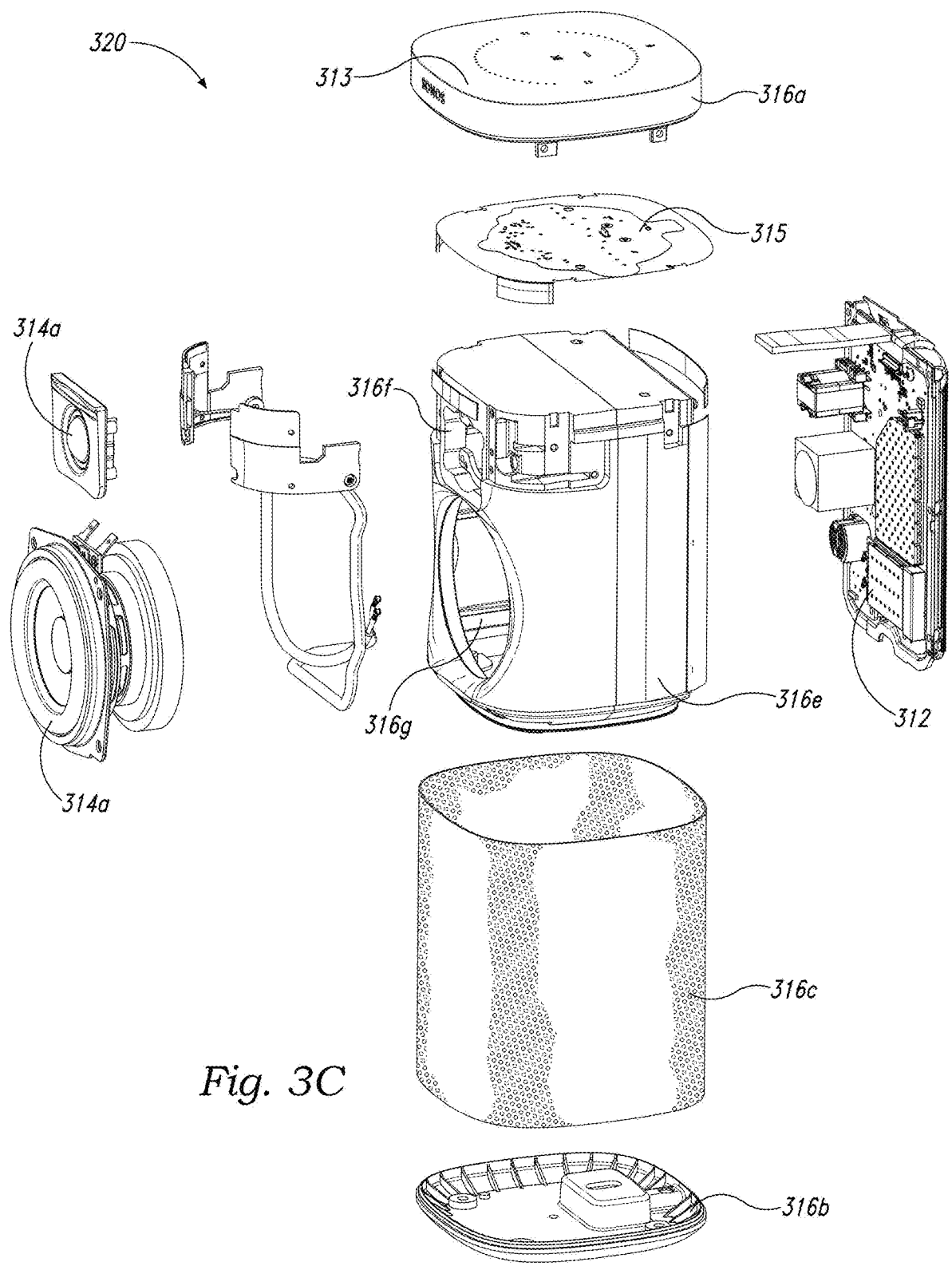
FIG. 3C is an exploded view of the network microphone device of FIGS. 3A and 3B.
Figure 3D:
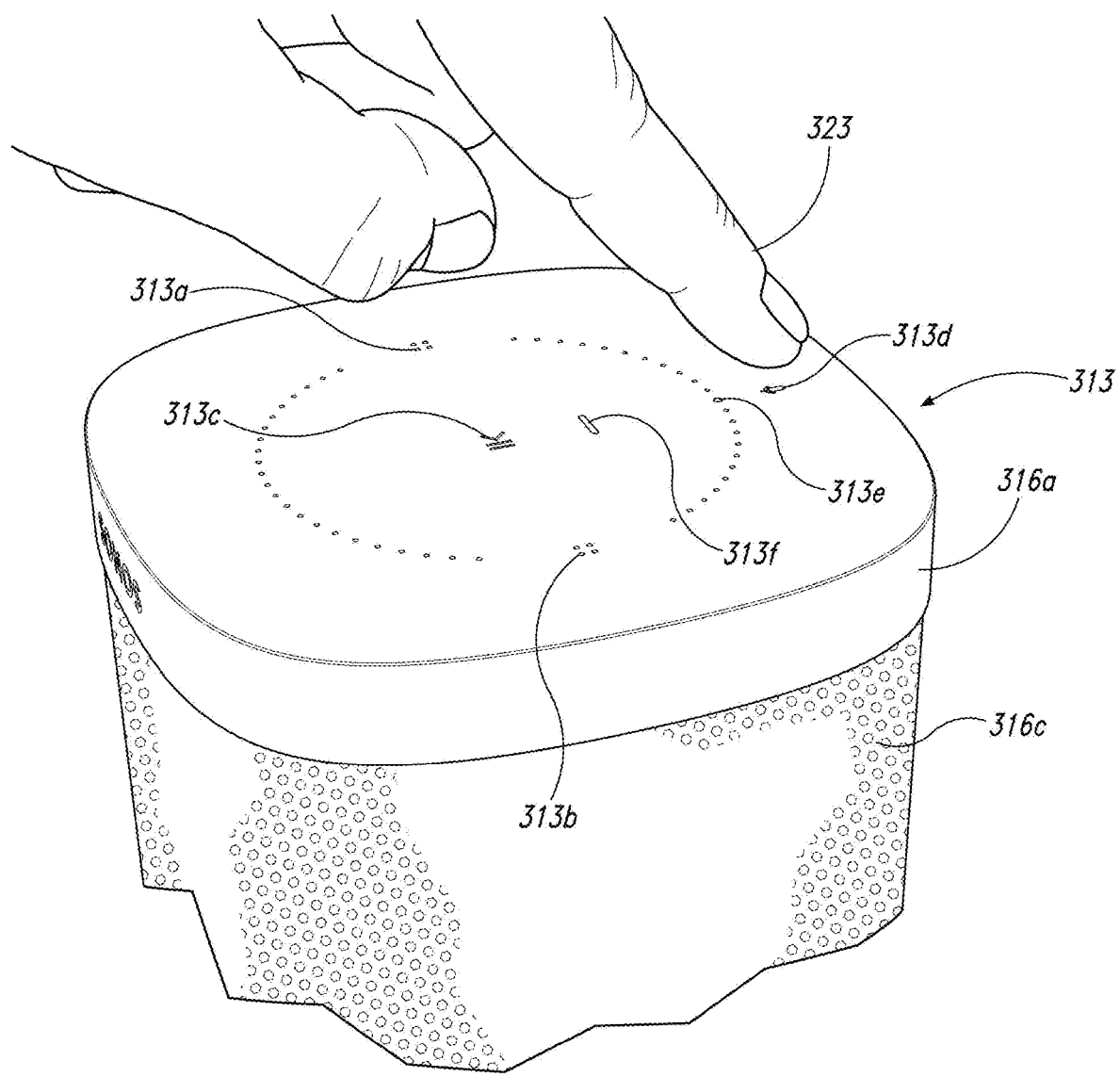
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1D. In certain embodiments, the electronics 312 includes components described above with respect to FIG. 1G such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1D, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1C) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1C, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1C, suitable content sources can include a device or storage communicatively coupled to the NMD 320 via a LAN (e.g., the network 104 of FIG. 1C), a remote server (e.g., one or more of the remote computing devices 106 of FIG. 1C), etc. In certain embodiments, however, the NMD 320 determines and/or performs one or more actions corresponding to the one or more voice commands without intervention or involvement of an external device, computer, or server.

Figure 3E:
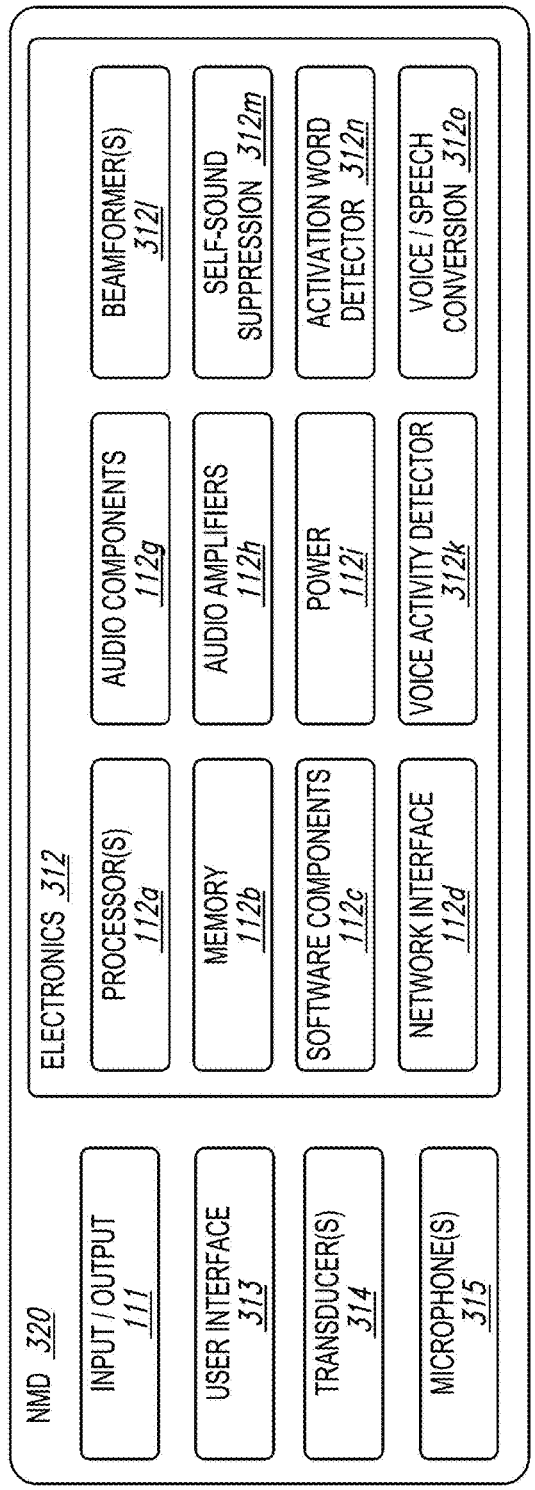
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
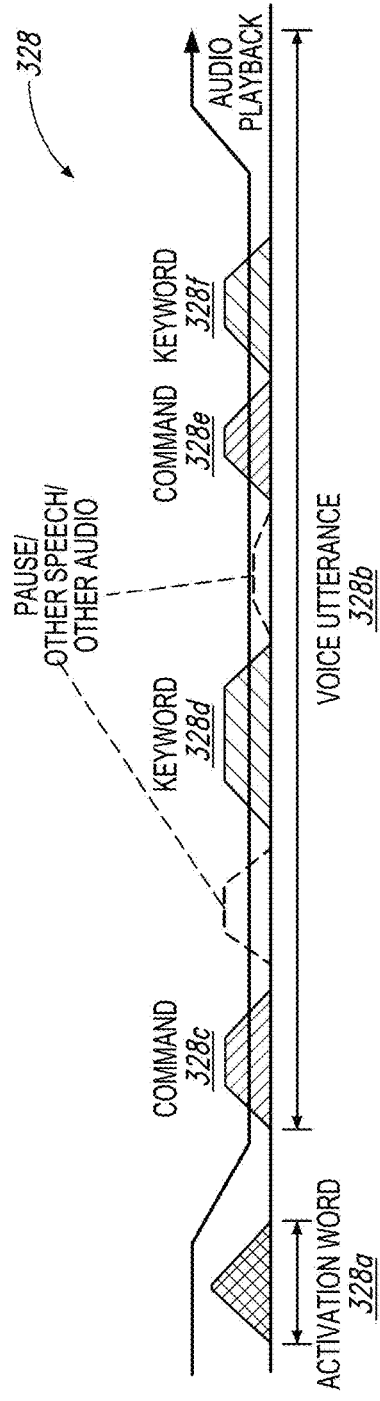
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition, or alternately, an NMD may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1B. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
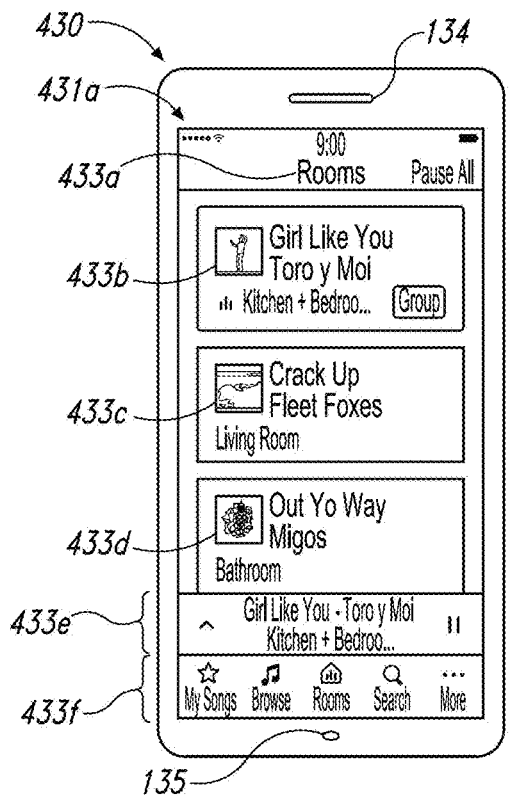
FIGS. 4A-4D are schematic diagrams of a control device in various stages of operation in accordance with aspects of the disclosed technology.
Figure 4B:
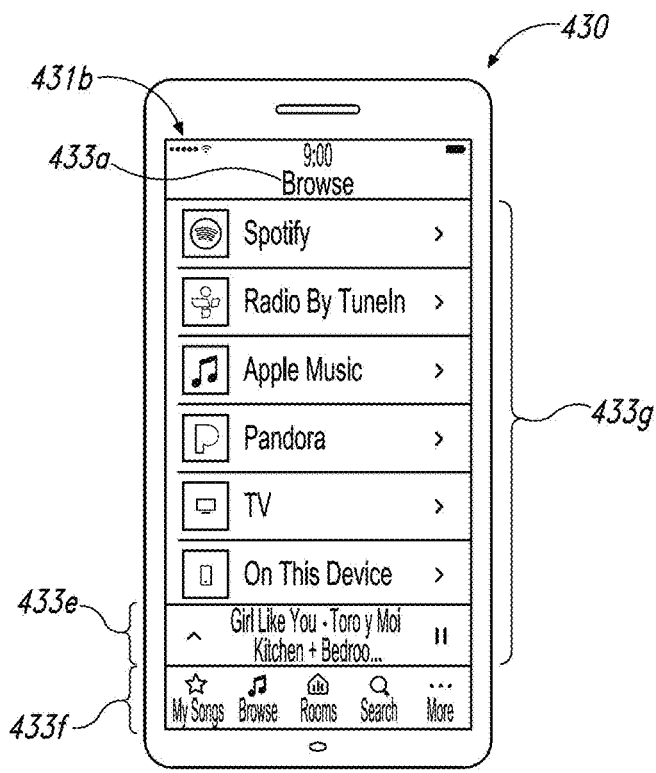
Figure 4C:
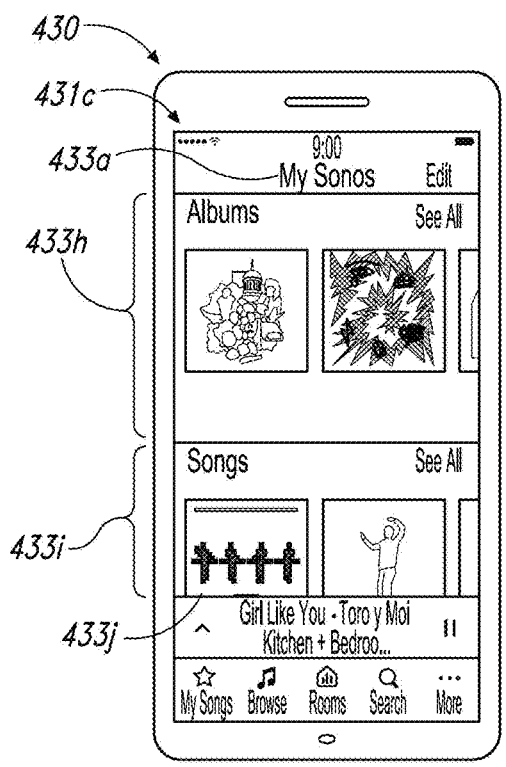
Figure 4D:
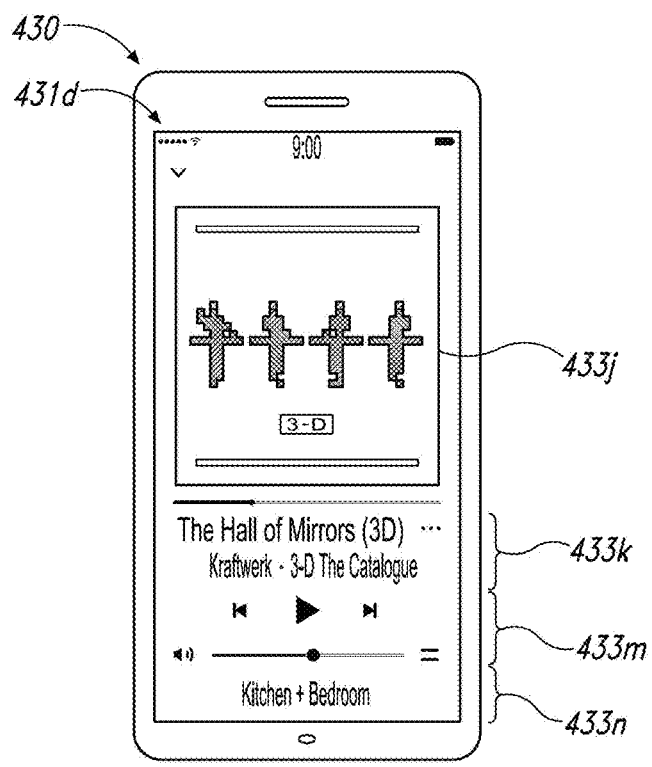

FIGS. 4A-4D are schematic diagrams of a control device 430 (e.g., the control device 130a of FIG. 1I, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by TuneIn, Apple Music, Pandora, Amazon, TV, local music, line-in) through which the user can browse and from which the user can select media content for play back via one or more playback devices (e.g., one of the playback devices 110 of FIG. 1D). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
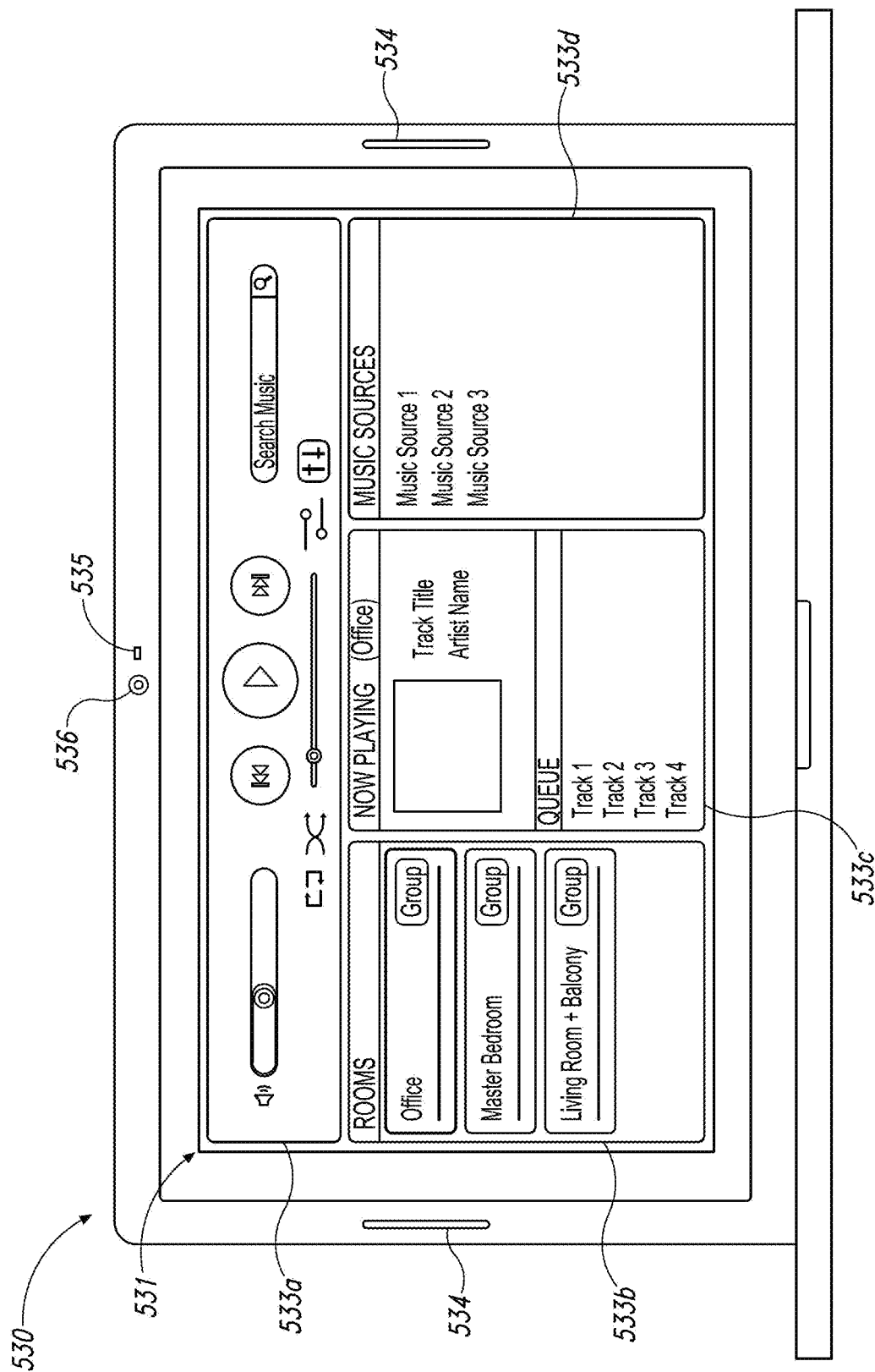
FIG. 5 is front view of an example control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1B and 1N). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a URI, a URL or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue or be associated with a new playback queue that is empty, or contains audio items from the playback queue associated with the established zone group before the established zone group was ungrouped.

Figure 6:
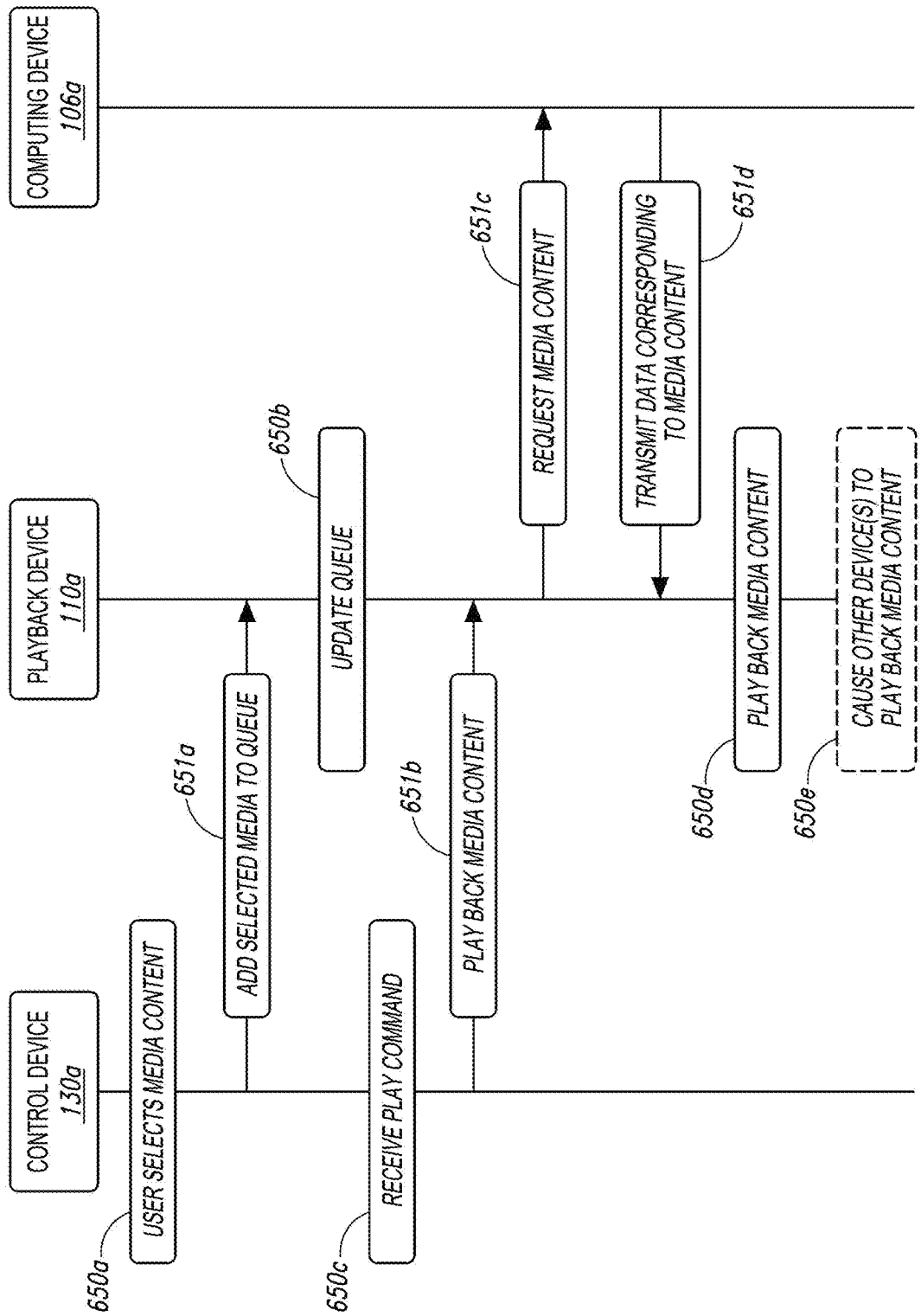
FIG. 6 is an example message flow diagram of a media playback system.

FIG. 6 is a message flow diagram illustrating data exchanges between devices of the media playback system 100 (FIGS. 1B-1N).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1D) connected to the media playback system and/or media items stored on one or more media service servers (one or more of the remote computing devices 106 of FIG. 1C). In response to receiving the indication of the selected media content, the control device 130a transmits a message 651a to the playback device 110a (FIGS. 1B-1D) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1N). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

V. Example Audio-Based and Video-Based Social Experiences

A. Continuity of Playback

As noted above, one of the benefits of leveraging the playback devices in a media playback system for use in conjunction with a video communication device is that the playback devices in a media playback system may be more numerous and widespread throughout a given environment, such as a house. This distribution of devices may allow a user who begins a video and/or audio call in a given room via the video communication device to move to another room that contains a playback device, which may assume responsibility for rendering of the audio portion of the call. In some examples, if the playback device is equipped with a microphone capable of capturing the user's speech, it may assume responsibility for doing so and thereby maintain or manage two-way communication for the call.

The manner in which the responsibility for rendering an audio portion of a call and/or the responsibility for capturing user speech during the call is transferred between devices may take various forms. As one example, the video communication device on which the call originates may continue to receive the audio and video stream for the call, but may transmit the audio portion of the stream to the playback device if it is determined that the user moved to a different room that contains the playback device.

Figure 7:
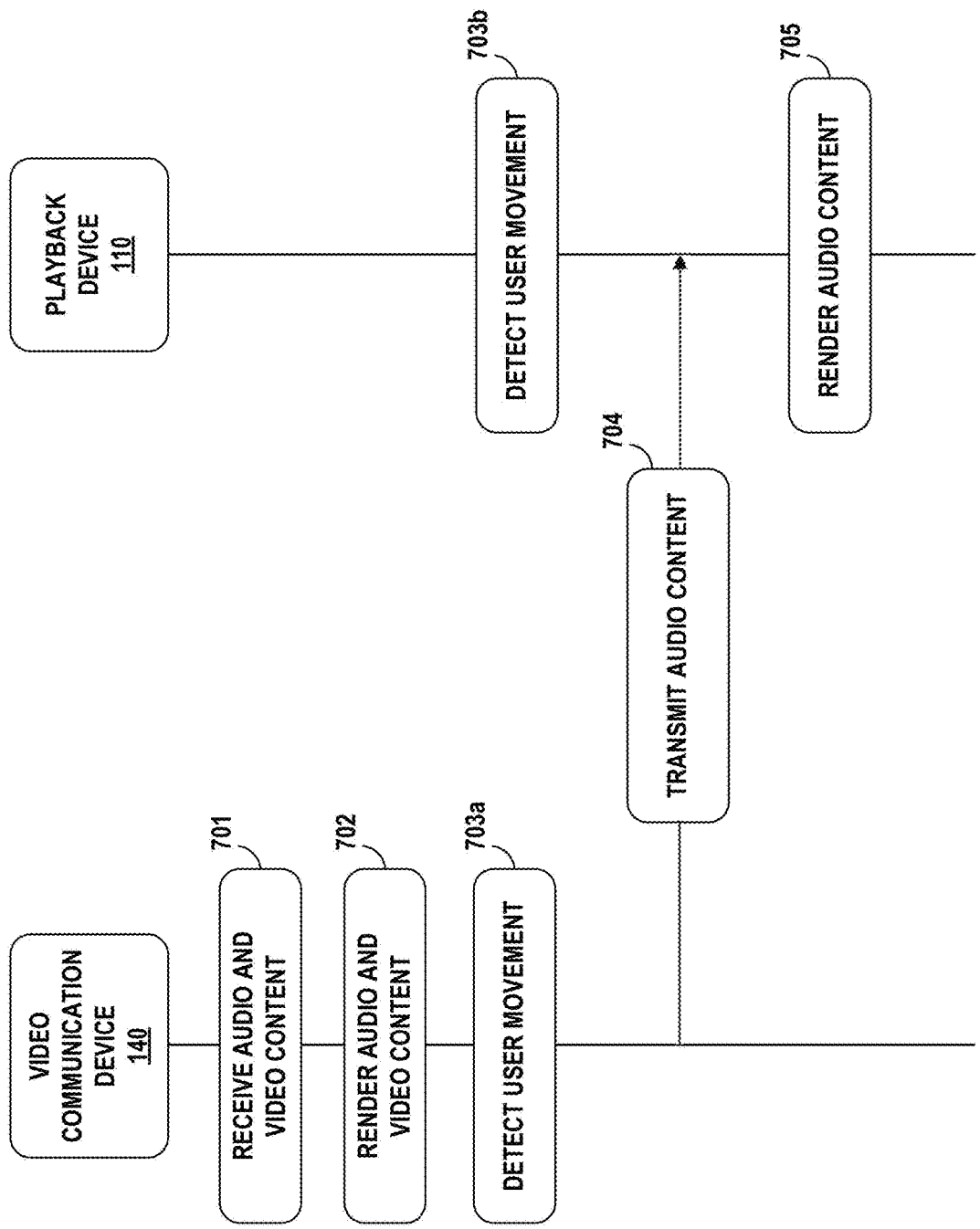
FIG. 7 is an example message flow diagram of devices in a playback environment.

FIG. 7 illustrates a message flow diagram for such an example including an example video communication device 140 and an example playback device 110. As one possibility, and with reference to the example media playback system 100 shown in FIGS. 1B-1C, the video communication device 140 may be located in the kitchen 101*h*, and the example playback device 110 may be the playback device 110*m* located in the master bedroom 101*b*. Further, although the video communication device 140 might not be a member of the media playback system 100, it may nonetheless communicate with the playback device 110 and other devices of the media playback system 100 (e.g., a control device 130) via a network such as network 104. Other arrangements are also possible.

As shown in FIG. 7, the video communication device 140 receives audio and video content at block 701. The received audio and video content may correspond to an ongoing two-way video call that a user is participating in with another user in a different location (e.g., a different house), among other possibilities. Further, the audio and video content may be received from a computing platform that facilitates the video call, such as the communications platform 160 shown in FIG. 1A, although other sources are also possible. For example, the audio and video content may be received from a social-media computing platform that is facilitating the call. The received audio and video content may take various forms, including a single, composite stream of audio and video content or separate audio and video streams.

At block 702, the video communication device 140 renders the audio and video content, which may involve displaying the video content via a graphical display and playing back the audio content via one or more speakers. In addition to receiving and rendering the audio and video content, the video communication device 140 may also be capturing audio and video data, via one or more microphones and cameras, respectively, and transmitting the captured audio and video data to the communications platform 160 where it may be relayed to the other user.

At block 703*a*, the video communication device 140 may detect user movement that may indicate that the user has relocaated to a different room, and is no longer in the kitchen 101*h*. For example, the video data captured by the video communication device 140 may indicate that the user moved out of the field of view of the camera. Further, the audio data captured by the video communication device 140 may indicate that the user's speech is no longer audible, and perhaps that the user moved progressively further from the microphone while speaking.

At block 703*b*, the playback device 100 may also detect user movement. In this case, the playback device 100, located in the master bedroom 101*b*, may detect that the user is now located in the master bedroom 101*b*. For instance, the playback device 110 may detect the user's speech via a microphone that provides an indication of the user's location within the master bedroom 101*b*. The indication of the user's location may then be provided to the video communication device 140, and possibly to other devices in the media playback system 100. In some implementations, an indication of the user's location may be determined via the transmission and detection of an ultrasonic audio signal, as discussed in U.S. Patent Publication No. 2020/0401365 entitled, "Ultrasonic Transmission for Presence Detection," which is incorporated herein by reference in its entirety. Various other examples of determining a user's location within a given environment will be discussed below.

At block 704, based on the determination that the user is located in the master bedroom 101*b*, the video communication device 140 may transmit the received audio content to the playback device 110. For example, the video communication device 140 may transmit the audio content over a WiFi network on which the media playback system 100 operates, and to which the video communication device 140 is also connected. The audio content may be transmitted over other types of networks as well.

In some implementations, where the video communication device 140 receives a composite stream of audio and video content from the communications platform 160, the video communication device 140 may first isolate the audio content for transmission. Alternatively, the video communication device 140 may transmit a request for the communications platform 160 to begin transmitting separate audio and video streams for the video call, to facilitate the video communication device 140 transmitting the audio content to the playback device 110 once it is received. Numerous other possibilities also exist.

At block 705, after receiving the audio content, the playback device 100 may render the audio content. In this way, the user may be able to move from room to room within the given environment and experience a relatively continuous call experience (with respect to audio content), even though the call originated on the video communication device 140, which may be a stationary device. Further, once the audio content is received by the playback device 110, additional functionalities of the media playback system 100 may be utilized. For instance, the user may designate one or more other playback devices in the media playback system 100 to play back the received audio content in synchrony with the playback device 110.

In the example shown in FIG. 7 and discussed above, the video communication device 140 might discontinue rendering one or both of the audio content and the video content once the audio content is transmitted to the playback device 110 at block 704. Further, the video communication device 140 may also discontinue capturing one or both of audio and video content for the video call while it is transmitting the audio content to the playback device 110. Other examples are also possible.

FIG. 7 provides just one illustrative example of how the responsibility for rendering an audio portion of a call may be transferred between devices. As another example, once the video communication device 140 and/or the playback device 110 determine that the user is located proximate to the playback device 110, the video communication device 140 may provide an indication to the communications platform 160 that the audio content should be transmitted to the playback device 110, rather than the video communication device 140. Accordingly, the communications platform 160 may discontinue transmitting the audio content (and perhaps also the video content) to the video communication device 140, and instead, may transmit the audio content to the playback device 110. Reducing the number of devices that the audio content must be transmitted between in this way may improve the playback of the audio content by the playback device 110 in various ways.

In some implementations, a user's location in relation to the video communication device 140 or a given playback device might not be the only criteria that is used to determine when to transfer audio rendering responsibility from one device to another. For instance, the media playback system 100 may include a playback device 110 in the form of headphones that communicate wirelessly (e.g., over WiFi) with the other playback devices in the media playback system 100. Further, the headphones may include one or more sensors that can provide an indication that the user is donning or doffing the headphones. Such an action may be interpreted as a cue that the user wishes to change the device that is handling the audio content for the call. Accordingly, the video communication device 140 may receive an indication that the user has donned a playback device 110 in the form of headphones. As another possibility, the user may additionally, or alternatively, tap the headphones to the video communication device 140 (e.g., hold the headphones in very close proximity to the video communication device 140, which may or may not include actually touching them to each other). This action may be detected by the video communication device 140 and interpreted as a cue that the user wishes to transfer audio playback responsibility to the headphones. For instance, the video communication device 140 may detect the proximity of the headphones via near-field communication (NFC), ultra-wide band (UWB) communications, RF signal strength, among other possibilities.

In response, the video communication device 140 may discontinue rendering the audio content of the call and instead, transmit the audio content for the call to the headphones. As one example, the video communication device 140 may transmit a message to the headphones, or perhaps to a control device (e.g., a smartphone) to which the headphones are connected (e.g., via a Bluetooth link). The message may contain a session identifier and/or an authorization token for the video call that facilitates the headphones assuming responsibility for the audio content of the video call. However, if the video communication device 140 still detects the presence of the user (e.g., via visual or audio recognition) while the call is active, the video communication device 140 might continue rendering the video portion of the call.

Similarly, if the user doffs the headphones, it may be taken as a cue that the user wishes to transfer the rendering of the audio content back to the video communication device 140. Accordingly, the video communication device 140 may discontinue transmitting the audio content to the headphones and instead, may resume rendering the audio content in conjunction with the video content. In either situation, the handoff of the audio content between devices might be implemented gradually, fading out at the device that is discontinuing audio content playback and fading in at the device that is assuming responsibility for the audio content. This type of gradual handoff may occur simultaneously at the two devices, such that the audio content is played back by the two devices in synchrony briefly during the transition. Other examples are also possible.

Consistent with the discussion above, the video communication device 140 and or media playback system 100 may maintain a priority list that designates which device should handle rendering of the audio convent for a given call when multiple potential devices are available (e.g., when multiple potential devices are in the same room as the user). For instance, an available playback device 110 may be assigned a higher priority for the rendering of audio content than a video communication device 140. Thus, if the user is determined to be in a room that includes both a video communication device 140 and a playback device 110, the audio content will be transmitted to the playback device 110 for playback, while the video communication device 140 will handle rendering of the video content. While the video communication device 140 remains in the call, the playback device 110 that is rendering the audio content may enter a "video call mode" or similar state that prevents certain other function of the playback device 110 from being used, so as not to interrupt the call. For instance, while the playback device 110 is rendering the audio content from a video call, it may not be possible to group the playback device 110 with another playback device that is playing back music.

As another possibility, a headphone device, when donned by a user, may be given audio rendering priority over all other devices. However, when the headphone device is doffed it may be given no priority or removed as a rendering option altogether. Similarly, other portable devices may be given audio rendering priority when a user indicates that the portable device should be used (e.g., by tapping the video communication device 140 as noted above) and may maintain priority until the user indicates that priority should be passed to another playback device (e.g., by tapping the video communication device 140 or another playback device). In this way, a user may utilize the portable playback device as a mechanism to move the audio portion of a video call around the user's home.

As yet another possibility, a control device of the media playback system 110, such as the control device 130a shown in FIG. 1C, may be selected as an audio and/or video rendering device when no other devices are available in the vicinity of the user, or when the user indicates that the control device should assume responsibility, similar to a portable playback device as noted above. Numerous other variations are also possible.

In other implementations, the audio and video content of the call may take other forms. For instance, the video content of a given call may include a text-based message or other textual information that is displayed via the graphical display of the video communication device 140. In such a situation, one or both of the video communication device 140 and the playback device 110 may include text recognition capabilities that may provide for the text to be read aloud by a voice assistant that is provided on one or more devices of the media playback system 100. This may allow a user to move away from the graphical display of the video communication device 140 and still receive the message. Further, this may allow visually-impaired users to experience a text-based messages that they might not otherwise be able to experience via the video communication device 140.

As noted above, the transferring of responsibilities from one device to another during a given call may involve determining a user's location within the given environment during the call. In this regard, determining a user's location within the given environment may take various forms. As one example, the video communication device 140 may employ facial recognition and other visual tracking techniques on image data captured by its camera(s) to estimate a user' presence within the room in which the video communication device 140 is located. Similarly, such visual tracking techniques might also provide an indication that a user has left the room in which the video communication device 140 is located. Further, the microphone(s) of the video communication device 140 may capture the user's speech or other audio data that may provide an estimation of the user's location.

As another example, one or more playback devices 110 that are located in different rooms (or the same room) of the given environment may also be equipped with sensors that can provide an indication of a user's location. For instance, a playback device 110 that includes one or more microphones may collect audio data such as user speech that provides an estimate of the user's location in relation to the playback device 110, and may indicate that the user has moved into the room that contains the playback device 110.

As another example, other triggers may be used alone or in combination with the indications of user presence discussed herein to facilitate certain call-related functionality of a playback device. For instance, a user might enter a room and close the door behind them, which may be inferred as an indication that the user has moved into the room to engage in the call, thus causing all playback devices in the room to transition into a video call mode in which they collectively assume responsibility for the audio content of the call. An indication that the door was closed may be determined in various ways, including via sensors associated with the door. Further, the one or more microphones may capture the audio data of the door closing, which may be determined by an audio processing algorithm (e.g., based on audio training data) to be indicative of a door closing. Similarly, the video communication device 140 may capture image data of the door closing, which may be determined by a video processing algorithm (e.g., based on image training data) to be indicative of a door closing. Likewise, when the door opens and/or the user leaves the room, which may be detected via one or more of the manners noted above, the playback devices in the room may transition back to a normal operating mode.

Other examples and further discussion of using triggers to change the state of a playback device can be found in U.S. Pat. No. 10,042,642 entitled, "Activity Rest," which is incorporated herein by reference in its entirety.

As yet another example, a control device 130 of the media playback system may include sensors that, either alone or in conjunction with the sensors of one or more playback devices 110, may provide an indication of a user's location within the given environment. For instance, a user's smartphone that is running an application for controlling the media playback application will typically be used as a control device 130, and will often remain in proximity to the user (e.g., in the user's pocket) as the user moves within the given environment. Accordingly, the sensors of the control device 130 such as a microphone, accelerometer, and/or RF antenna may collect data that may be used to provide an indication of the user's location.

As one possibility, a measurement of the RF signal strength (e.g., a received signal strength indicator ("RSSI")) between the control device 130 and one or more playback devices 110 of the media playback system 100 may be used to estimate the control device's proximity (as a proxy for the user's proximity) to the one or more playback devices 110. Additional details regarding the use of RSSI measurements to estimate a user's location in a media playback system can be found, for example, in U.S. Patent Publication No. 2021/0099829 entitled, "Systems and Methods for Device Localization and Prediction," filed on Sep. 27, 2019, which is incorporated herein by reference in its entirety.

Similarly, the user might utilize a wearable device such as a smartwatch or a headset microphone that utilizes a Bluetooth communication link to connect to the user's control device 130. As above, a measure of the Bluetooth signal strength may be used to estimate the user's location with respect to one or more playback devices 110.

As another possibility, a control device 130 may periodically emit an ultrasonic, near-ultrasonic (e.g., 19-20 kHz) or infrasonic tone that may be detected by one or more playback devices 110 of the media playback system 100. Conversely, such tones may be emitted by the one or more playback devices 110 and detected by the control device 130. In either case, the detected audio information may be used to estimate the location of the control device 130, and by extension, the user, in relation to the one or more playback devices 110.

As can be seen in the examples above, various implementations for determining the location of a user within a given environment involve identifying an object that is associated with the user and then tracking the location of the object as a proxy for the location of the user. Once an estimate of the user's location is determined, a rendering device can be selected and assigned to the user. The operations of associating an object with a given user, tracking the object, and selecting a rendering device for the user may be carried out by one or more of the computing devices discussed herein, such as the video communication device 140, the playback device 110, the control device 130, or a cloud-based computing system, among other possibilities.

In some implementations, multiple users in the same environment may be involved in a given call and may each be tracked individually to provide a continuity of experience for each user. For instance, a first user and a second user in the same room may initiate a call via a video communication device 140. Thus, the video communication device 140 may initially be assigned as the rendering device for both users. A short time later, the first user may leave the room carrying a control device 130 (e.g., a smartphone) or a portable playback device, which may be identified and tracked by an RSSI measurement, for example. Accordingly, the control device 130 may be associated with the first user.

It may then be determined, based on RSSI measurements, that the first user has moved to a room that does not include any playback devices 110 of the media playback system 100. Thus, in the absence of other nearby options, the control device 130 may be selected as the rendering device for the first user, replacing the video communication device 140. Thus, the audio content and possibly video content of the call may be transmitted to the control device 130. In addition, the control device 130 may be designated as the device that captures the first user's speech and transmits such information for the call.

Meanwhile, the second user may have remained in the room with the video communication device 140. Thus, the video communication device 140 is still associated as the rendering device for the second user, and continues to render the audio and video content, even though the first user is no longer present. However, the second user may eventually don headphones that act as a playback device 110 of the media playback system. Accordingly, the headphones may be associated with the user as an indicator of the user's location and may be further selected as the rendering device for the second user, which may result in the video communication device 140 discontinuing its rendering of the audio content for the call, although the video content may still be rendered.

Thereafter, it may be determined, based on RSSI measurements, ultrasonic audio tones, etc., that the first user has moved to a different room that includes a playback device 110 of the media playback system 100. Thus, the playback device 110 may be selected as the rendering device for the first user, replacing the control device 130. Thus, the audio content for the call may be transmitted to the playback device 110.

Finally, the second user, wearing the headphones that are rendering the audio content for the call, may leave the initial room containing the video communication device 140. Based on again on RSSI measurements, ultrasonic audio tones, etc., it may be determined that the second user has joined the first user in the room that contains the playback device 110. Accordingly, because the second user is no longer present, the video communication device 140 may discontinue rendering the video content for the call. The second user may then doff the headphones, which may cause the playback device 110 to be selected as the rendering device for the second user (in addition to the first user), replacing the headphones.

In some embodiments, an indication that a user wishes to transfer the rendering of audio content to a pair of headphones may imply that the user does not wish to disturb others, or that the user wishes to engage in a private conversation. Accordingly, a pair of headphones taking responsibility for the rendering of the audio content may be a trigger that causes all other playback devices rendering the audio content out loud to be muted or discontinued. In other words, the system may cause the headphones to pull in audio into the headphones only. Video playback by the video communication device 140 may be discontinued as well, perhaps depending on user preference. Further, this functionality might be specific to conversations that occur in a particular room, such as the office 101e shown in FIG. 1B. Accordingly, when the user is wearing headphones on a call in the office, the audio content may be rendered in a private mode to the headphones only. But if the user leaves the office without headphones on and the call is still ongoing, the rendering of the audio content may be switched back to an out loud mode or the audio content may be pushed out to other playback devices that follows the user on playback devices around the house, as noted above.

In some implementations, a user's location within a given environment may be associated with a confidence level, which may be adjusted based on various factors. The confidence level may be a range or scale. For example, on a scale of 1 to 5, a "1" may represent low confidence that a user is in a particular location while a "5" may represent high confidence that a user is in a particular location. For example, relatively high RSSI signal measurements may result in a high confidence level in the location of the device that serves as a proxy for the user. However, confidence levels may generally drop over time unless another relatively strong indication of user presence is detected. In one example, when the system has the highest confidence that the user is in a particular location (e.g., "Kitchen"), the system may assign a confidence level of "5" to the "Kitchen" to indicate that the user is in the Kitchen based on the relatively high RSSI signal measurement. After a predetermined amount of time (e.g., 5 minutes) where the RSSI signal measurement does not reach a high state, the confidence level may be adjusted to a lower confidence level (e.g., confidence level 4).

Determining a user's location within the given environment and other criteria for transferring audio rendering responsibility from one device to another in the given environment may take various other forms as well.

As will be apparent from the discussion above, certain examples may involve sensor data that may be received from multiple different devices. In this regard, because each device may have its own individual clock, the timestamps associated with such sensor data may need to be converted to a universal time format in order to be analyzed. Such a conversion may be carried out by one or more of the computing devices discussed herein.

It should be understood that any of the implementations discussed herein that involve determinations of user location, user tracking, or user identification (e.g., visual identification, audio identification), even through a proxy device, may require user consent. Additionally, the various operations discussed above may be carried out in one or more ways that may tend to provide increased security. For instance, any processing that is related to user identification, location, and tracking may be handled by local devices, such that the associated information is not sent to the Internet or any cloud-based computing platforms. Further, the devices discussed herein may facilitate a "do not track" list for certain users, or entire households, who prefer not to have such information about them used. In this regard, one or more the devices discussed above may correlate various types of identifying information (e.g., visual identification, spoken identification, frequently associated devices, etc.) for individuals, which may allow the devices to apply the "do not track" more completely across different types of sensor inputs.

Various other privacy-based enhancements are also possible.

B. Interactive Experiences Across Different Environments

As another example, the playback devices 110 of a media playback system 100 may be used to provide notifications of upcoming events that may be experienced via the video communication device 140. Such notifications may be customizable based on a user's preferences, including the ability to opt-in or opt-out of certain notifications, or to direct certain types of notifications or notifications for certain types of events to particular playback devices within the system, among other possibilities. Additional details regarding providing upcoming even notifications via the playback devices in a media playback system can be found, for example, in U.S. Patent Application Publication No. 2020/0073731 entitled, "Audio Notifications," filed on Oct. 1, 2018, which is incorporated herein by reference in its entirety.

In addition to the notifications mentions above, the playback devices 110 of a media playback system 100 may also include do not disturb functionality, which may be utilized to avoid interruptions to a call. Details regarding thus type of do not disturb functionality can be found, for example, in U.S. Pat. No. 10,880,650 entitled, "Network Microphone Devices with Automatic Do Not Disturb Actuation Capabilities," filed on Dec. 10, 2017, which is incorporated herein by reference in its entirety.

In another example implementation, a video and/or audio call may be enhanced with one or more audio effects that may correspond to the content of the call, which may be pre-established. For example, an author may read an excerpt from a novel on a broadcast that may be accessed by numerous participants. On a smaller scale, a parent may read a story to a child who is in a different location. As the author or parent reads, one or more speech recognition algorithms may track the reader's position within the given content. This information may then be used to cue supplemental audio content that may be played back by one or more playback devices at the listeners' location in connection along with the spoken words. The supplemental audio content may take various forms, including background music or sound effects that may accompany the content that is being read.

Further, a voice filter may be applied to the reader's voice when they read the dialog of certain characters, thereby changing the sound of the reader's voice. As yet another possibility, the reader may be presented with one or more interface controls that they may use to manually trigger certain audio effects. The audio effects may be triggered by sending an audio notification indicating particular audio clips to playback and/or priority for playback. Such interface controls may be included on a graphical display of a video communication device 140, or may be temporarily mapped to the button controls of a playback device 110.

To facilitate such experiences, a marketplace or similar repository may provide downloadable stories and other video and/or audio content that have built-in audio cues that are triggered based on a reader's position within the content. Other implementations are also possible.

As another example, a playback device that is not currently rendering audio content for a given call may be capable of joining the call, so that additional listeners who were not initially involved in the call can listen in. For instance, a parent may which to join a call that is ongoing in another room between their child and the child's grandparents. The parent may press and hold a button on an interface of a playback device, which may cause the playback device (e.g., in the kitchen) to join a video communication device 140 and/or other playback devices in the child's room that are already in video call mode. Other gestures or commands are also possible. In this example, the video communication devices in both the child's room and on the grandparent's end of the call may display an indication that the kitchen playback device has joined the call.

Alternatively, an indication of the kitchen playback device may be displayed on one or both of the child's or the grandparent's video playback device to provide an indication of where the parent is currently located in the house, but without rendering the audio content of the call. If, during the call, either member of the call wants to invite the parent to the call or otherwise speak to the parent, the video communication devices 140 may provide a push-to-talk or similar intercom functionality by selecting the indication of the kitchen playback device. Still further, if a user is listening to the audio content of a call via a playback device that does not have a microphone, an indication may be provided via the video communication device(s) that the user does not have audio capture capabilities.

Another example of an interactive experience contemplated herein involves adjusting captured audio content to simulate the spectral response of the room in which the listening user is located. For example, an audio stream (e.g., user speech) that is captured in a highly reverberant room with many reflective surfaces can sound jarring when rendered by a playback device that is located in a furnished room with very little reverberation.

Accordingly, one or more playback devices 110 may identify the audio characteristics of the room in which the one or more playback devices 110 are located. The audio characteristics may be identified based on actively sampling the frequency response of the room, previously captured calibration information, or other information. Thereafter, upon receiving an audio stream associated with another user in a different location, the playback device 110 may apply one or more filters to the incoming audio stream to simulate the frequency response of the room in which it is located. In this way, it may sound to a user more like the speaker on the other end of the call is speaking in the same room as the user.

C. Managing Multiple Audio and Video Streams

As noted above, the devices discussed herein may facilitate experiences such as shared music listening or shared movie watching between different locations. Various challenges may be associated with such experiences, including the resolution of multiple different audio streams in a coherent way for users in both locations. For example, in the case of shared movie-watching or music-listening, the different audio streams may include the source audio content, multiple dialog channels of call audio from users in both locations, and potentially background noise from one or both users, which may be desirable to incorporate in some situations. If such audio streams are not accurately resolved, it may degrade a user's shared experience.

As one example solution, the movie or music content may be synchronized with the call audio that was captured on the other end of the call based on a click track or similar audio feedback. The synchronization may be carried out by one or more devices, either locally or in the cloud. For instance, both the call audio and the movie or music content may be transmitted to a video communication device 140 and/or a playback device 110 of a given media playback system 100, which may synchronize the two audio streams and then transmit the resulting multi-stream content to the rendering device that was determined based on the considerations noted above. Additional details regarding mirroring content between devices in different households can be found, for example, in U.S. Pat. No. 10,587,693 entitled, "Mirrored Queues," which is incorporated herein by reference in its entirety.

As another example, the call audio and the movie or music content may be handled separately based on their different bandwidths and relative sensitivity to latency. For instance, the movie or music content may be more easily bufferable, and therefore may be transmitted to the rendering device ahead of the call audio. As the call audio is received, it may be given a higher priority than the movie or music content and a smart signal generator may coordinate the call audio with the audio rendered locally. Additional details regarding mixing two different audio streams can be found, for example, in U.S. Pat. No. 9,665,341 entitled, "SYNCHORNIZED AUDIO MIXING," filed on Feb. 9, 2015, which is incorporated herein by reference in its entirety.

Other examples for coordinating the rendering of movie of music content with call audio are also possible.

In another implementation involving managing multiple audio streams, a karaoke experience may be provided between two or more users in different locations, which may involve multiple versions of a given song that may be provided to the participants based on their given role, e.g., the performer(s) and the listener(s). For instance, a performer may receive a first version of a given song to be rendered a few seconds ahead of the listeners. Thereafter, the performer's vocal audio stream may be transmitted to the cloud and then synchronized with a second version of the given song that is then transmitted to the listeners. Further, the different audio streams that contain the reactions of listeners in different locations may also be aligned such that listener reactions appear synchronized fashion to the performers.

VI. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A video communication device comprising:
   at least one speaker;
   at least one graphical display;
   at least one processor;
   at least one non-transitory computer-readable medium; and
   program instructions stored on the at least one non-transitory computer-readable medium that are executable by the at least one processor such that the video communication device is configured to:
      receive, from a computing platform via a wide area network (WAN), a composite stream including video content and audio content corresponding to a video call;
      render (i) the video content via the at least one graphical display and (ii) the audio content via the at least one speaker;
      while rendering (i) the video content and (ii) the audio content, determine that a user of the video communication device is located more closely to an audio playback device than to the video communication device, wherein the audio playback device is connected to the video communication device via a local area network (LAN); and
      based on determining that the user is located more closely to the audio playback device than to the video communication device:
         continue rendering the video content;
         discontinue rendering the audio content;
         transmit a request to the computing platform to thereby cause the computing platform to switch from (a) transmitting the composite stream including the video content and the audio content to the video communication device to (b) transmitting a first stream and a second stream to the video communication device, wherein the first stream includes the video content and the second stream includes the audio content; and
         transmit the audio content in the second stream to the audio playback device via the LAN such that the audio playback device renders the audio content while the video communication device renders the video content.

2. The video communication device of claim 1, further comprising:
   at least one microphone; and
   program instructions stored on the at least one non-transitory computer-readable medium that are executable by the at least one processor such that the video communication device is configured to:
      capture, via the at least one microphone, audio data;
      transmit the captured audio data to the computing platform via the WAN; and
      based on determining that the user is located more closely to the audio playback device than to the video communication device:
         discontinue transmitting the captured audio data to the computing platform via the WAN; and
         cause the audio playback device to (i) capture, via at least one microphone of the audio playback device, audio data and (ii) transmit the audio data captured by the audio playback device to the computing platform via the WAN.

3. The video communication device of claim 2, further comprising:
   at least one camera; and
   program instructions stored on the at least one non-transitory computer-readable medium that are executable by the at least one processor such that the video communication device is configured to:
      capture, via the at least one camera, video data;
      transmit the captured video data to the computing platform via the WAN; and
      based on determining that the user is located more closely to the audio playback device than to the video communication device:
         discontinue transmitting the captured video data to the computing platform via the WAN.

4. The video communication device of claim 2, further comprising program instructions stored on the at least one non-transitory computer-readable medium that are executable by the at least one processor such that the video communication device is configured to, based on determining that the user is located more closely to the audio playback device than to the video communication device:
   discontinue capturing the audio data.

5. The video communication device of claim 1, further comprising program instructions stored on the at least one non-transitory computer-readable medium that are executable by the at least one processor such that the video communication device is configured to:

before rendering (i) the video content and (ii) the audio content, determine that the user is located more closely to the video communication device than to the audio playback device.

6. The video communication device of claim 1, wherein the program instructions that are executable by the at least one processor such that the video communication device is configured to determine that the user is located more closely to the audio playback device than to the video communication device comprise program instructions that are executable by the at least one processor such that the video communication device is configured to determine that a first RSSI measurement between the audio playback device and a control device of the user is greater than a second RSSI measurement between the video communication device and the control device of the user.

7. The video communication device of claim 1, further comprising program instructions stored on the at least one non-transitory computer-readable medium that are executable by the at least one processor such that the video communication device is configured to:
receive an indication that an ultrasonic tone emitted by a control device of the user was detected by the audio playback device; and
wherein the program instructions that are executable by the at least one processor such that the video communication device is configured to determine that the user is located more closely to the audio playback device than to the video communication device comprise program instructions that are executable by the at least one processor such that the video communication device is configured to determine that the user is located more closely to the audio playback device than to the video communication device based on receiving the indication that the ultrasonic tone emitted by the control device of the user was detected by the audio playback device.

8. The video communication device of claim 1, wherein:
the audio playback device is a portable audio playback device;
the video communication device further comprises program instructions stored on the at least one non-transitory computer-readable medium that are executable by the at least one processor such that the video communication device is configured to receive an indication of a user input at the portable audio playback device; and
the program instructions that are executable by the at least one processor such that the video communication device is configured to determine that the user is located more closely to the audio playback device than to the video communication device comprise program instructions that are executable by the at least one processor such that the video communication device is configured to determine that the user is located more closely to the audio playback device than to the video communication device based on receiving the indication of the user input at the portable audio playback device.

9. The video communication device of claim 8, wherein the portable audio playback device comprises headphones, and wherein the program instructions that are executable by the at least one processor such that the video communication device is configured to receive the indication of the user input at the portable audio playback device comprise program instructions that are executable by the at least one processor such that the video communication device is configured to receive, from the headphones, an indication that the user has donned the headphones.

10. The video communication device of claim 8, wherein the program instructions that are executable by the at least one processor such that the video communication device is configured to receive the indication of the user input at the portable audio playback device comprise program instructions that are executable by the at least one processor such that the video communication device is configured to detect, via an NFC sensor of the video communication device, that the user has tapped the portable audio playback device to the video communication device.

11. A non-transitory computer-readable medium, wherein the non-transitory computer-readable medium is provisioned with program instructions that, when executed by at least one processor, cause a video communication device to:
receive, from a computing platform via a wide area network (WAN), a composite stream including video content and audio content corresponding to a video call;
render (i) the video content via at least one graphical display and (ii) the audio content via at least one speaker;
while rendering (i) the video content and (ii) the audio content, determine that a user of the video communication device is located more closely to an audio playback device than to the video communication device, wherein the audio playback device is connected to the video communication device via a local area network (LAN); and
based on determining that the user is located more closely to the audio playback device than to the video communication device:
continue rendering the video content;
discontinue rendering the audio content;
transmit a request to the computing platform to thereby cause the computing platform to switch from (a) transmitting the composite stream including the video content and the audio content to the video communication device to (b) transmitting a first stream and a second stream to the video communication device, wherein the first stream includes the video content and the second stream includes the audio content; and
transmit the audio content in the second stream to the audio playback device via the LAN such that the audio playback device renders the audio content while the video communication device renders the video content.

12. The non-transitory computer-readable medium of claim 11, wherein the non-transitory computer-readable medium is also provisioned with program instructions that, when executed by at least one processor, cause the video communication device to:
capture, via at least one microphone, audio data;
transmit the captured audio data to the computing platform via the WAN; and
based on determining that the user is located more closely to the audio playback device than to the video communication device:
discontinue transmitting the captured audio data to the computing platform via the WAN; and
cause the audio playback device to (i) capture, via at least one microphone of the audio playback device, audio data and (ii) transmit the audio data captured by the audio playback device to the computing platform via the WAN.

13. The non-transitory computer-readable medium of claim 12, wherein the non-transitory computer-readable medium is also provisioned with program instructions that, when executed by at least one processor, cause the video communication device to:
  capture, via at least one camera, video data;
  transmit the captured video data to the computing platform via the WAN; and
  based on determining that the user is located more closely to the audio playback device than to the video communication device:
    discontinue transmitting the captured video data to the computing platform via the WAN.

14. The non-transitory computer-readable medium of claim 11, wherein the non-transitory computer-readable medium is also provisioned with program instructions that, when executed by at least one processor, cause the video communication device to:
  before rendering (i) the video content and (ii) the audio content, determine that the user is located more closely to the video communication device than to the audio playback device.

15. The non-transitory computer-readable medium of claim 11, wherein the program instructions that, when executed by at least one processor, cause the video communication device to determine that the user is located more closely to the audio playback device than to the video communication device comprise program instructions that, when executed by at least one processor, cause the video communication device to determine that a first RSSI measurement between the audio playback device and a control device of the user is greater than a second RSSI measurement between the video communication device and the control device of the user.

16. The non-transitory computer-readable medium of claim 11, wherein the non-transitory computer-readable medium is also provisioned with program instructions that, when executed by at least one processor, cause the video communication device to:
  receive an indication that an ultrasonic tone emitted by a control device of the user was detected by the audio playback device; and
  wherein the program instructions that, when executed by at least one processor, cause the video communication device to determine that the user is located more closely to the audio playback device than to the video communication device comprise program instructions that, when executed by at least one processor, cause the video communication device to determine that the user is located more closely to the audio playback device than to the video communication device based on receiving the indication that the ultrasonic tone emitted by the control device of the user was detected by the audio playback device.

17. The non-transitory computer-readable medium of claim 11, wherein:
  the audio playback device is a portable audio playback device;
  the non-transitory computer-readable medium is also provisioned with program instructions that, when executed by at least one processor, cause the video communication device to receive an indication of a user input at the portable audio playback device; and
  the program instructions that, when executed by at least one processor, cause the video communication device to determine that the user is located more closely to the audio playback device than to the video communication device comprise program instructions that, when executed by at least one processor, cause the video communication device to determine that the user is located more closely to the audio playback device than to the video communication device based on receiving the indication of the user input at the portable audio playback device.

18. The non-transitory computer-readable medium of claim 17, wherein the portable audio playback device comprises headphones, and wherein the program instructions that, when executed by at least one processor, cause the video communication device to receive the indication of the user input at the portable audio playback device comprise program instructions that, when executed by at least one processor, cause the video communication device to receive, from the headphones, an indication that the user has donned the headphones.

19. The non-transitory computer-readable medium of claim 17, wherein the program instructions that, when executed by at least one processor, cause the video communication device to receive the indication of the user input at the portable audio playback device comprise program instructions that, when executed by at least one processor, cause the video communication device to detect, via an NFC sensor of the video communication device, that the user has tapped the portable audio playback device to the video communication device.

20. A method carried out by a video communication device, the method comprising:
  receiving, from a computing platform via a wide area network (WAN), a composite stream including video content and audio content corresponding to a video call;
  rendering (i) the video content via at least one graphical display and (ii) the audio content via at least one speaker;
  while rendering (i) the video content and (ii) the audio content, determining that a user of the video communication device is located more closely to an audio playback device than to the video communication device, wherein the audio playback device is connected to the video communication device via a local area network (LAN); and
  based on determining that the user is located more closely to the audio playback device than to the video communication device:
    continuing rendering of the video content;
    discontinuing rendering of the audio content;
    transmitting a request to the computing platform and thereby causing the computing platform to switch from (a) transmitting the composite stream including the video content and the audio content to the video communication device to (b) transmitting a first stream and a second stream to the video communication device, wherein the first stream includes the video content and the second stream includes the audio content; and
    transmitting the audio content in the second stream to the audio playback device via the LAN such that the audio playback device renders the audio content while the video communication device renders the video content.

\* \* \* \* \*